(12) United States Patent
Collins et al.

(10) Patent No.: US 8,682,699 B2
(45) Date of Patent: Mar. 25, 2014

(54) SYSTEMS AND METHODS FOR CUSTOMER-RELATED RISK ZONES

(75) Inventors: Dean M. Collins, Manchester, CT (US); Bryan Smith, Glastonbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 13/334,897

(22) Filed: Dec. 22, 2011

(65) Prior Publication Data

US 2012/0173290 A1   Jul. 5, 2012

Related U.S. Application Data

(60) Provisional application No. 61/427,201, filed on Dec. 26, 2010.

(51) Int. Cl.
*G06Q 40/00* (2012.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | |
|---|---|---|
| 7,343,306 B1 | 3/2008 | Bates et al. |
| 7,610,210 B2 | 10/2009 | Helitzer |
| 7,701,363 B1 | 4/2010 | Zlojutro |
| 7,769,608 B1 | 8/2010 | Woll |
| 7,966,203 B1 * | 6/2011 | Pietrzak ............................ 705/4 |
| 8,022,845 B2 | 9/2011 | Zlojutro |
| 8,024,111 B1 | 9/2011 | Meadows et al. |
| 8,046,245 B1 | 10/2011 | Woll |
| 8,140,265 B2 | 3/2012 | Grush |
| 8,289,187 B1 | 10/2012 | Kerr |
| 8,332,242 B1 | 12/2012 | Medina, III |
| 8,489,433 B2 | 7/2013 | Altieri et al. |
| 8,538,785 B2 | 9/2013 | Coleman et al. |
| 8,606,512 B1 | 12/2013 | Bogovich et al. |
| 2003/0187698 A1 | 10/2003 | Bonissone et al. |
| 2004/0153362 A1 * | 8/2004 | Bauer et al. .................... 705/10 |
| 2005/0261943 A1 | 11/2005 | Quarterman et al. |
| 2006/0100912 A1 | 5/2006 | Kumar et al. |
| 2007/0225915 A1 * | 9/2007 | Weinzapfel et al. ............. 702/3 |
| 2007/0282638 A1 | 12/2007 | Surovy |
| 2008/0228531 A1 | 9/2008 | Kenedy et al. |
| 2011/0106370 A1 | 5/2011 | Duddle |
| 2011/0161116 A1 * | 6/2011 | Peak et al. ........................ 705/4 |
| 2011/0161119 A1 | 6/2011 | Collins |
| 2012/0029945 A1 | 2/2012 | Altieri |
| 2012/0084103 A1 | 4/2012 | Altieri |
| 2014/0019170 A1 | 1/2014 | Coleman et al. |

FOREIGN PATENT DOCUMENTS

WO   WO2009012627   1/2009

OTHER PUBLICATIONS

International Preliminary Report on Patentability for PCT/US2011/067037 mailed Jul. 11, 2013, 7 pp.
International Search Report for PCT/US2011/067037 mailed Aug. 28, 2012, 3 pp.
Written Opinion of the International Searching Authority for PCT/US2011/067037 mailed Aug. 28, 2012, 5 pp.
Connecticut Innovation Press Release, "Shizzlr Inc. Joins C Tech Incubator", Jan. 18, 2011; 1 pp.
St. Paul Pioneer Press, "Bar Cams Reveal Where the Action Is", by Alex Friedrich, Mar. 17, 2008; 4 pp.
Office Action for U.S. Appl. No. 13/335,476 mailed Feb. 1, 2013, 8 pp.

\* cited by examiner

*Primary Examiner* — Jessica Lemieux

(74) *Attorney, Agent, or Firm* — Fincham Downs LLC; Carson C. K. Fincham

(57) ABSTRACT

Systems, apparatus, methods, and articles of manufacture that provide for outputting and utilization of risk zone information are provided. In some embodiments, risk zone information may be utilized to select, price, and/or manage an insurance policy.

21 Claims, 11 Drawing Sheets

OVERLAY / FILTER OPTIONS — 810

ACTIVITY TYPE 842
- COMMUTING
- VACATION
- WORK
- ...

OPERATOR CHARACTERISTICS 844-1
- TEENAGER
- 25-35 YRS OLD
- 35-45 YRS OLD
- 45-55 YRS OLD
- SENIOR
- ...
- ☐ CDL
- ☐ DEFENSIVE DRIVING TRAINING

OPERATOR ATTRIBUTES 844-2
- < 1 HR DRIVING
- 1-3 HRS DRIVING
- 3-6 HRS DRIVING
- > 6 HRS DRIVING
- ...
- ☐ TIRED
- ☐ DISTRACTED
- ☐ CELL PHONE USE

VEHICLE CHARACTERISTICS 846-1
- YEAR: 2008
- ALL MAKES: ACURA, DODGE, ...
- ALL MODELS: DURANGO, RAM 1500, ...
- ☐ ANTI-LOCK BRAKES
- ☐ SIDE-CURTAIN AIRBAGS
- ☐ TPMS
- ☐ RUN-FLAT TIRES
- ☐ SIDE-VIEW MIRROR SIGNALS
- ☐ HIGH-VISIBILITY TURN SIGNALS
- ☐ ACCIDENT AVOIDANCE

VEHICLE ATTRIBUTES 846-2
- ☐ TOWING
- ☐ BEING TOWED
- ☐ ROOF-TOP CARGO CARRIER
- ☐ BIKE RACK
- ☐ INTERNAL CARGO

FIG. 8

SYSTEMS AND METHODS FOR CUSTOMER-RELATED RISK ZONES

CROSS-REFERENCE TO RELATED APPLICATIONS

This application claims benefit and priority under 35 U.S.C. §119(e) to U.S. Provisional Application No. 61/427,201, filed on Dec. 26, 2010 and titled "RISK ZONES", which application is hereby incorporated by reference herein in its entirety.

This application is also related to U.S. patent application Ser. No. 13/335,476 filed on Dec. 22, 2011 in the name of Collins et al. and titled "SYSTEMS AND METHODS FOR CLIENT-RELATED RISK ZONES".

BACKGROUND

People, animals (pets, livestock, and wildlife), machines (vehicles and equipment), buildings, and businesses, are constantly subject to varying degrees and types of risk. While insurance companies often attempt to educate their customers regarding ways to minimize risk, general risk-avoidance strategies or best-practices are often insufficient to prevent reoccurrence of various accident and/or loss events. Therefore, it would be desirable to provide information and/or other mechanisms to customers that would help reduce occurrences of accidents and/or losses.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 8 is an example interface according to some embodiments;

DETAILED DESCRIPTION

Figure 1:
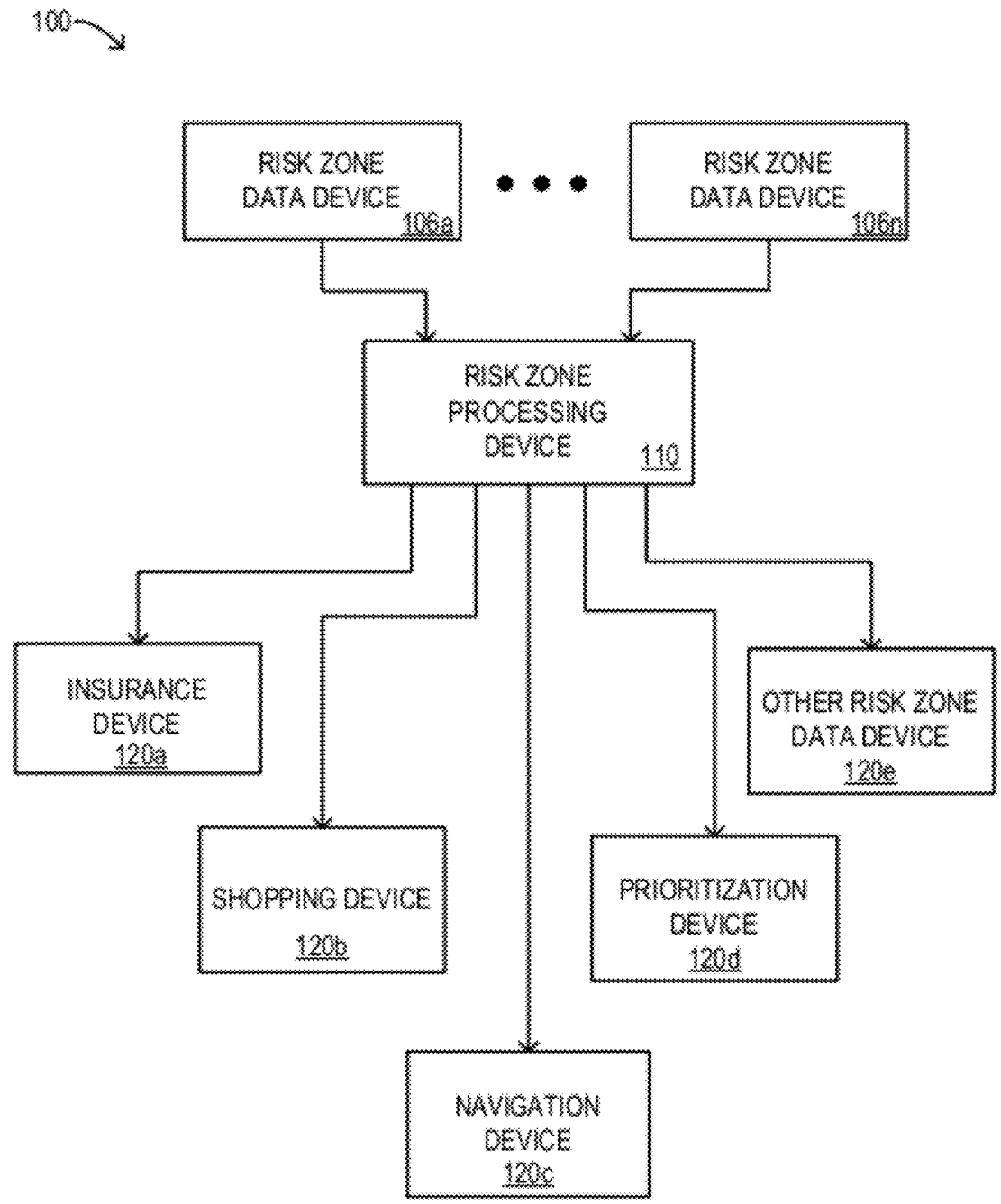
FIG. 1 is a block diagram of a system according to some embodiments.

Embodiments described herein are descriptive of systems, apparatus, methods, interfaces, and articles of manufacture for determination and utilization of customer-related risk zones. In some embodiments, for example, various risks associated with areas, objects, individuals, time periods, weather conditions, etc., may be monitored, aggregated, analyzed, tabulated, graphed, mapped, and/or otherwise processed and/or presented.

It may be beneficial, for example, for an insurance policy on an object (e.g., person and/or thing/item) to be structured to take into account the zones of risk within which the object exists, operates, passes through, and/or is otherwise associated. While standard insurance policies are written to take into account certain specific types of risk (e.g., how many miles are driven per year and/or the age and/or gender of the primary driver), for example, such determinations are generic and are often mostly or entirely not in the control of the insured (e.g., the insured is not likely to change gender or switch jobs to reduce commuting mileage just to qualify for a lower insurance premium).

Accordingly, in some embodiments, systems, apparatus, methods, interfaces, and articles of manufacture may comprise gathering and/or aggregating or otherwise determining risk data associated with various areas and/or objects and presenting such data in a manner that is useful to people, such as insurance customers (or anyone else desiring to be aware of, manage, and/or reduce risk in their lives), or to insurance companies for use in assessing, rating and/or pricing an insurance product. Insurance products may include any type of insurance products or services, including but not limited to life, property and casualty insurance (including but not limited to personal insurance, auto/motor, home, personal property, real property, watercraft, aircraft, spacecraft, general liability, surety and fidelity bonds, or any other type of insurance coverage).

In some embodiments, insurance policies and/or premiums thereof may be based (at least in part) on risk zones associated with an insured (and/or potential insured). An insurance company may, for example, determine risk data, process the risk data, provide the risk data (e.g., to one or more customers), receive an indication in response to the providing of the risk data (e.g., a selection of a risk-related option and/or an indication of an action and/or activity of a customer), and/or determine insurance information (e.g., premium levels, surcharges, discounts, deductible levels, and/or rewards) based on the received indication.

As used herein, the term "customer" may generally refer to any type, quantity, and or manner of entity with or for which policy, risk, telematics, and/or premium information may be determined in accordance with embodiments described herein. A customer may comprise an individual or personal insurance policy holder, for example, an individual covered by a personal insurance policy, and/or may comprise an individual, family, and/or other entity that seeks to price and/or obtain an insurance and/or other underwriting policy as described herein. A customer may have an existing business relationship with other entities described herein, such as an insurance company for example, or may not yet have such a relationship—i.e., a "customer" may comprise a "potential customer". As used herein, the term "customer-related" may generally refer to data or information that is based on, requested by, provided to, and/or otherwise associated with a customer.

Customer-related risk data may comprise, for example, risk data provided by a customer, risk data provided to a customer, risk data descriptive of one or more areas or objects associated with the customer (e.g., risk data for a road that the customer travels on and/or risk data for an object that the customer frequently interfaces with—directly or indirectly, such as a coffee maker or a furnace, respectively), risk data utilized to price, select, sell, and/or underwrite an insurance product (or product offering) for the customer, and/or any combinations thereof.

As used herein, the term "risk zone" may generally refer to an object and/or area (or portion of either) for which data indicative of risk is known, provided, obtained, and/or otherwise determined. The data indicative of risk may, for example, comprise data descriptive of events that have occurred in association with the object and/or area such as accidents, crimes, and/or other forms or types of losses or casualties. Risk data utilized to define risk zones may include, but is not limited to, car accident data, police logs or reports, insurance loss data, hospital data, veterinary data, forest and/or wildlife data, and/or environmental data. In some embodiments, risk data and/or risk zones developed therefrom may comprise sub-categories, such as the type of motor vehicle accident being categorized into car vs. car, car vs. truck, car vs. deer, car vs. guardrail, etc., and/or being segmented into different times of day, days of the week, weeks, months, seasons, etc.

Turning first to FIG. 1, a block diagram of a system 100 according to some embodiments is shown. In some embodiments, the system 100 may comprise a plurality of risk zone data devices 106a-n. The risk zone devices 106a-n may collect and/or store data descriptive and/or indicative of a level of risk of one or more objects and/or areas (e.g., zones). The risk zone devices 106a-n may, for example, comprise one or more databases, third-party data devices, sensors (e.g., web-based cameras and/or motion sensors, or other risk sensors such as one or more telematic devices as described in U.S. patent application Ser. No. 13/316,700 filed on Dec. 12, 2011 and titled "MONITORING CUSTOMER-SELECTED VEHICLE PARAMETERS IN ACCORDANCE WITH CUSTOMER PREFERENCES", the telematic monitoring and data concepts and descriptions of which are hereby incorporated by reference herein), and/or sensing devices configured and/or situated to determine risk zone data. In some embodiments, the risk zone data gathered and/or stored by one or more of the risk zone data devices 106a-n can be queried, collected, sensed, looked-up, and/or otherwise obtained and/or determined by a risk zone processing device 110. The risk zone processing device 110 may, for example, comprise one or more computers and/or servers in communication with the risk zone devices 106a-n. The risk zone processing device 110 may, in some embodiments, offer the risk zone information for sale and/or subscription to various entities, for various purposes.

According to some embodiments for example, the system 100 may also or alternatively comprise one or more of an insurance device 120a, a shopping device 120b, a navigation device 120c, a prioritization device 120d, and/or any other risk zone data device 120e. Any or all risk zone data collected, aggregated, and/or processed by the risk zone processing device 110, for example, may be provided to any or all of the insurance device 120a, the shopping device 120b, the navigation device 120c, the prioritization device 120d, and/or the other risk zone data device 120e. In some embodiments, any or all of the components 106a-n, 110, 120a-e of the system 100 may be similar in configuration, quantity, and/or functionality to any similarly-named and/or numbered components described in accordance with embodiments herein.

The insurance device 120a may comprise, for example, a device (and/or system) owned and/or operated by or on behalf of or for the benefit of an insurance company (and/or a customer thereof). The insurance company may utilize risk zone information, in some embodiments, to manage, analyze, design, rate, price, and/or otherwise structure, sell, underwrite, and/or purchase insurance products. Risk zone information may, for example, enhance the accuracy of insurance risk assessments and thus lead to more profitable, affordable, and/or reliable insurance product offerings. In some embodiments, risk zone information may be utilized to provide discounted premiums and/or other incentives or benefits to insurance customers. An insurance company may provide a discount to a customer willing to allow the insurer (or a third-party benefiting the insurer) access to risk zone information (such as number of "near-misses" while driving an automobile and/or while driving on a particular road or stretch thereof), for example, and/or may utilize risk zone information to note that a homeowner qualifies for a reduced insurance rate and/or risk rating (or should be charged a higher rate due to an increased risk rating for being in a particular risk zone). In some embodiments, insurance premiums, deductibles, surcharges, discounts, and/or rewards may be based on whether or not a customer accesses and/or utilizes risk zone information.

The shopping device 120b may, according to some embodiments, comprise a device (and/or system) that is utilized to incorporate risk zone information into shopping-related decision making processes. Consumers (e.g., customers) may utilize risk zone information to determine which stores and/or areas have experienced the highest rates of muggings and/or car break-ins, for example, or to determine the least (or less) risky route(s) to take to get to a particular store (and/or to choose which store to go to purchase an item based on the relative risk levels of routes and/or risk zones associated with traveling to the various stores).

The navigation device 120c may, according to some embodiments, comprise a device configured to make and/or facilitate navigational decisions based on risk zones. Risk zone data for certain roadways at certain times, for example, may be utilized to plot routes that are likely to be least (or less) risky (e.g., to avoid routes that have high number of car accidents, carjackings, vehicle thefts, etc.). In some embodiments, navigational routing may be altered (e.g., a "detour" function) and/or set based (at least in part) on risk zone information. A navigation device 120c that provides routing instructions from a first point to a second point, for example, may take into account not only the available routes, distances, and/or likely travel times during routing and/or re-routing calculations, but may also take into account risk zone information—e.g., by avoiding or suggesting the avoidance of high-risk areas in association with possible routes (and/or detour routes) between the first and second points.

According to some embodiments, the prioritization device 120d may comprise a device that makes and/or facilitates prioritization decisions based on risk zone data. The order of performing errands or tasks may be prioritized based on risk associated with the objects to be visited (e.g., time-based risk), for example, providing a suggestion that a customer "go to the cleaners first", "then do grocery shopping", because going to the grocery store at the current time of day is more likely to result in a slip or fall (compared to the suggested time—e.g., after having visited the cleaners first), or which rides to go on (and/or when) at an amusement park (e.g., before noon because that is when less injuries occur). In some embodiments, overall and/or "blended" risk zones may be utilized for navigation and/or prioritization. While a first road may be more risky (in general and/or at the current time) than a second road, for example, the first road may allow a person to arrive at a drycleaners during a time of less risk at the drycleaners, while the second and less risky road would not. Thus, the overall risk of a route, itinerary, and/or schedule may be determined and/or managed (e.g., to reduce expected and/or relative risk). Similarly, while a particular time can be established at which an amusement park ride will be less risky (e.g., fewer accidents per unit time than other times of the day, week, month, etc.), some embodiments may combine items on an itinerary, such as going on the ride and having lunch, to determine that the ride should be visited at a different (and perhaps even riskier) time, e.g., to avoid and/or reduce risk at a selected lunch establishment (for which risk may, for example, be a more difficult and/or serious affair than a "risky" ride).

The other risk zone data device 120e may comprise any other type and/or configuration of device that may be utilized to make and/or facilitate decision making processes based at least in part on risk zone information. The other risk zone data device 120e, for example, may comprise a device configured to monitor and/or analyze risk zone data for determining and/or suggesting a variety of activities, actions, avoidance practices, scheduling, and/or other guidance for a customer based on risk zone data. In some embodiments, for example, the other risk zone device 120e may comprise a Personal Computer (PC), smartphone, fitness device, home automation controller, security system, software application, web-based interface and/or tool, or any other network device and/or any combinations thereof, which facilitate provision of risk zone data to a customer.

In some embodiments, various user interfaces (e.g., the interfaces 600, 700, 800 of FIG. 6, FIG. 7, and/or FIG. 8 herein) may be utilized to enhance the ability to comprehend and/or utilize risk zone data/indices (which may often represent complex risk zone metrics, calculations, and/or concepts). An application for a mobile device (such as an Apple® iPhone® application, for example) may, in some embodiments, provide a visual indication of various risk zone metrics for stores, entertainment venues (such as amusement parks), restaurants, roads, buses, trains, amusement parts, etc., that are nearby and/or are otherwise of interest. According to some embodiments, risk zone data may be depicted visually on a map and/or as a layer on a map, such as may be provided, for example, by Google® Maps. Such visually-depicted risk zone information may comprise real-time, delayed, historical (e.g., historical aggregate, average, trend), and/or predicted data. In such a manner, for example, a customer of risk zone data may utilize a mobile and/or other device to view a map of risk zone data that allows the customer to plan errands, shopping, travel/transportation, and/or other tasks with an eye toward how "risky" such endeavors may be. In some embodiments, viewing and/or utilization of risk zone data may qualify the customer for reduced insurance premiums and/or deductibles, insurance discounts, and/or other rewards.

Figure 2:
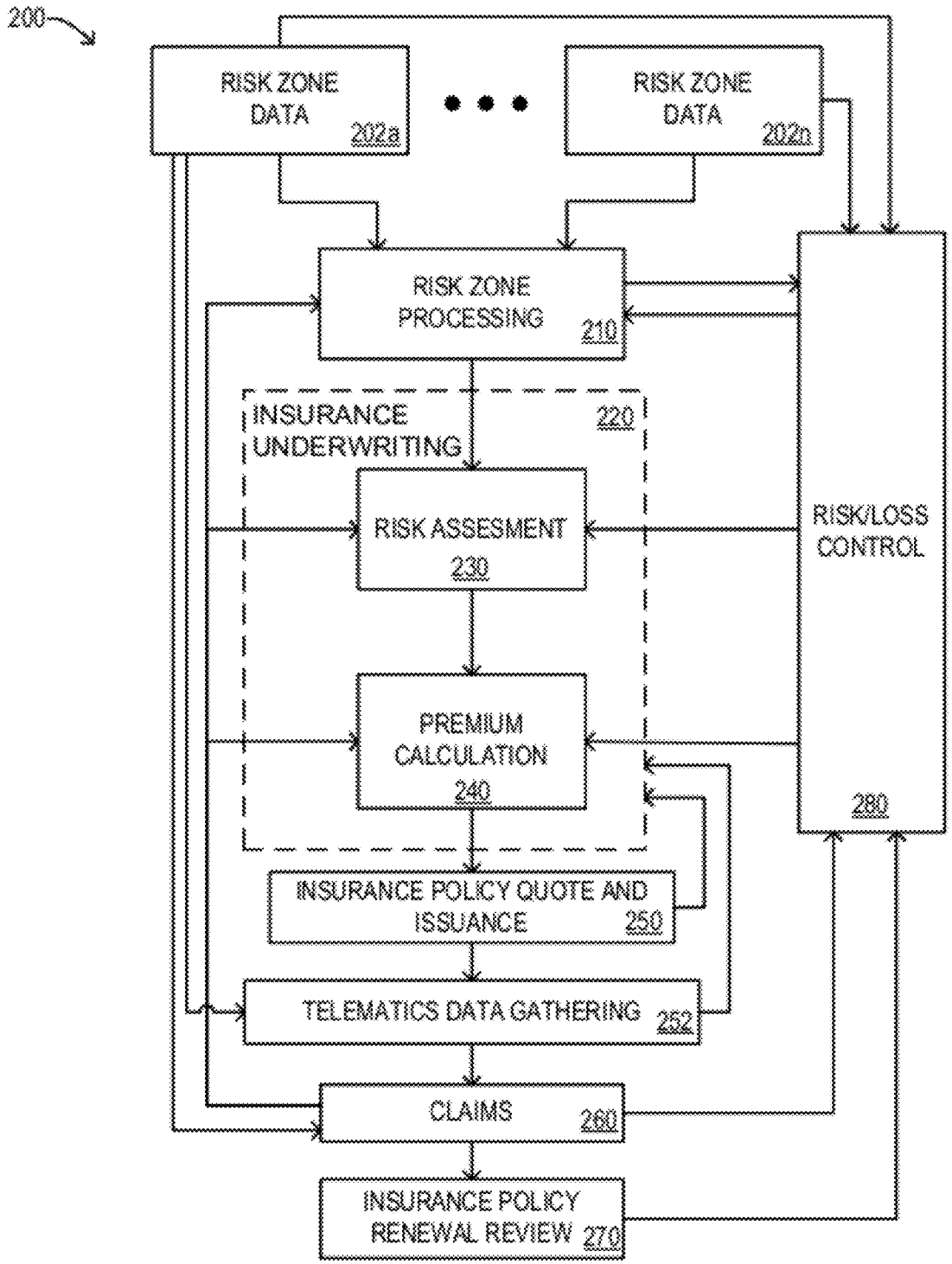
FIG. 2 is a block diagram of a process according to some embodiments.
Figure 10A:
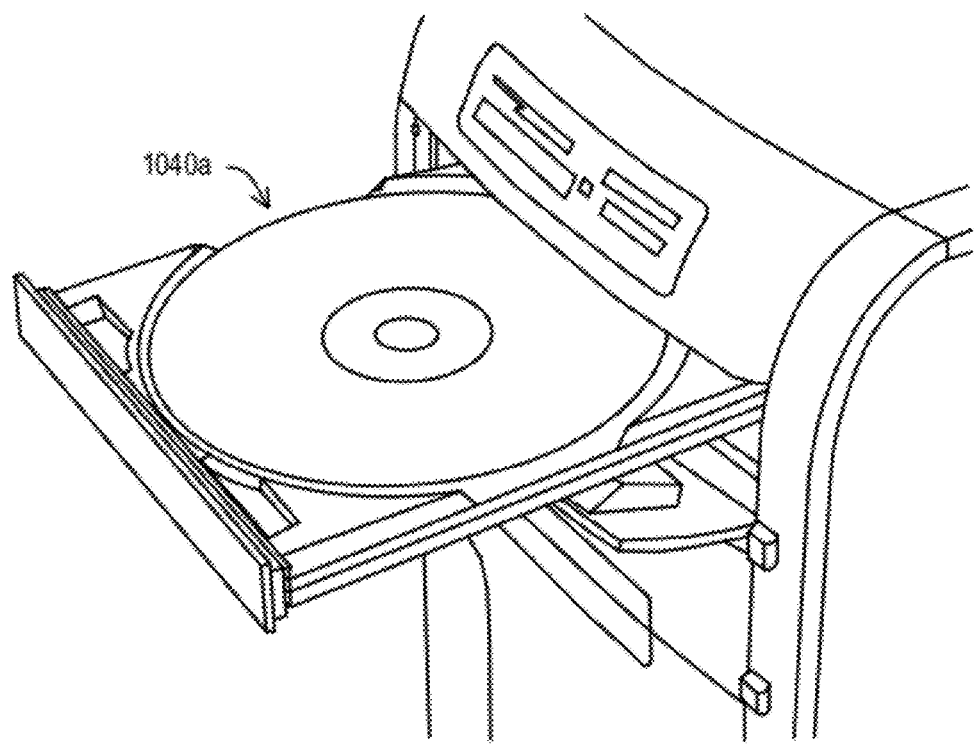
FIG. 10A, FIG. 10B, FIG. 10C, and FIG. 10D are perspective diagrams of exemplary data storage devices according to some embodiments.
Figure 10B:
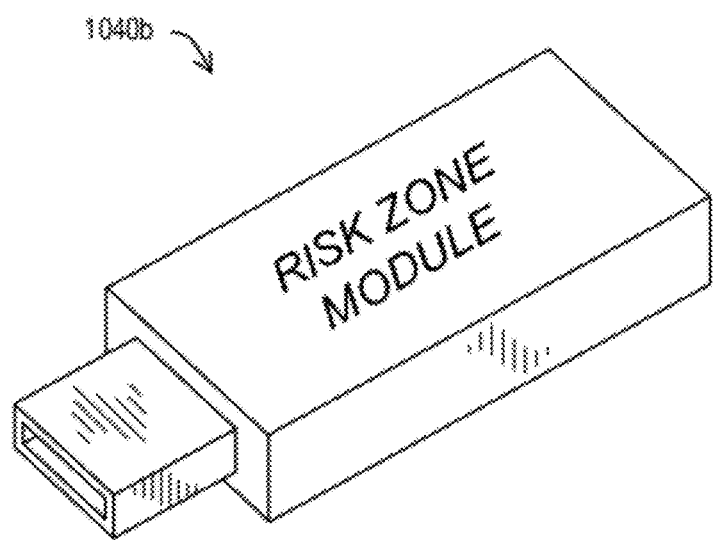
Figure 10C:
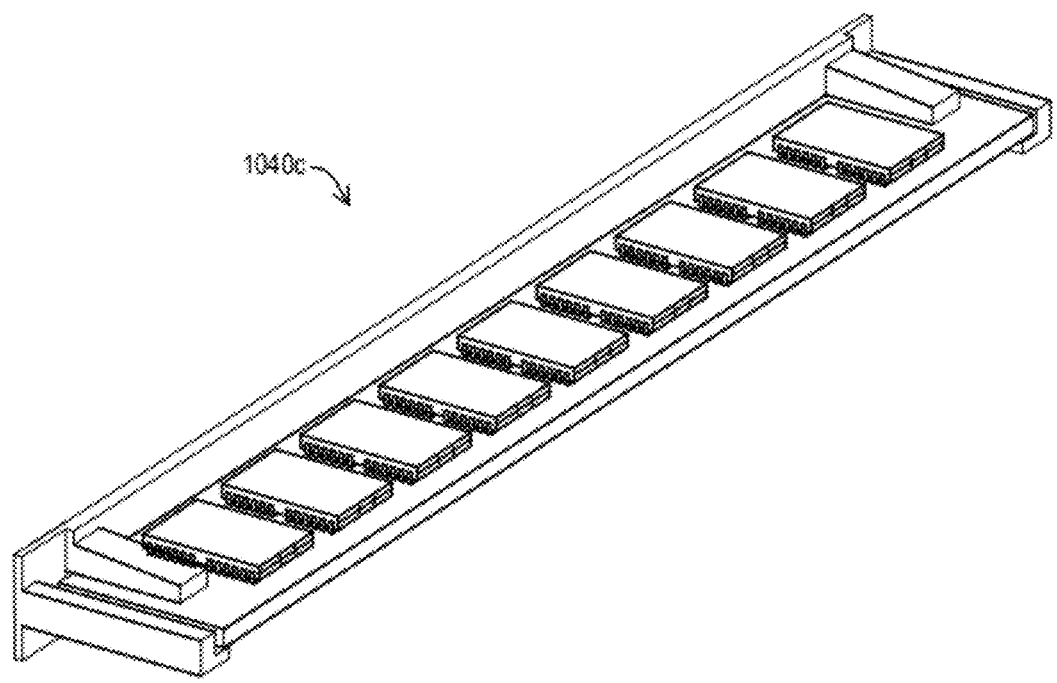
Figure 10D:
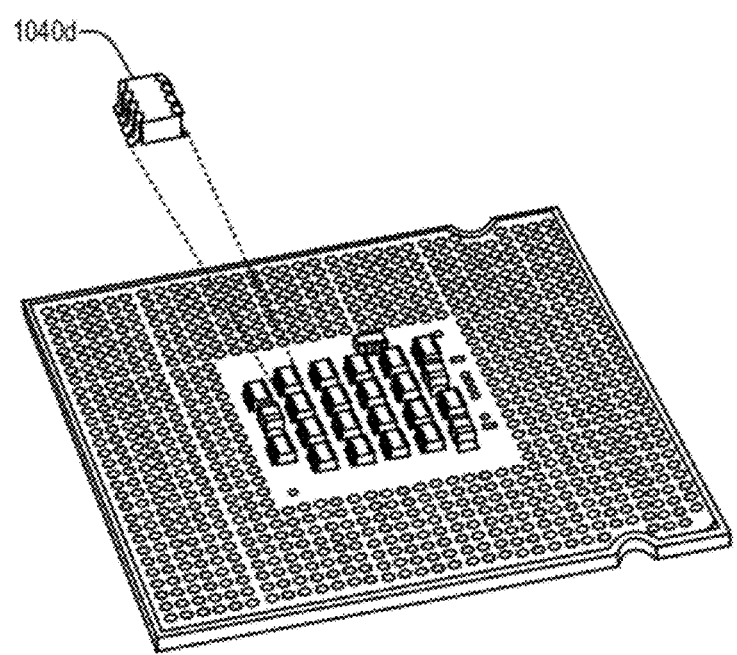

Referring now to FIG. 2, a block diagram of a process 200 according to some embodiments is shown. In some embodiments, the process 200 may be performed and/or implemented by and/or otherwise associated with one or more specialized and/or specially-programmed computers (e.g., the risk zone processing device 110 of FIG. 1), computer terminals, computer servers, computer systems and/or networks, and/or any combinations thereof (e.g., by one or more insurance company and/or underwriter computers). The process diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 1040a-d of FIG. 10A, FIG. 10B, FIG. 10C, and/or FIG. 10D herein) may store thereon instructions that when executed by a machine (such as a computerized processor) result in performance according to any one or more of the embodiments described herein.

According to some embodiments, the process 200 may comprise one or more actions associated with risk zone data 202a-n. The risk zone data 202a-n of one or more objects and/or areas that may be related to and/or otherwise associated with an insurance product and/or policy, for example, may be determined, calculated, looked-up, retrieved, and/or derived. In some embodiments, the risk zone data 202a-n may be gathered as raw data directly from one or more risk zone data sources as described herein and/or configured to record data indicative of a level of risk of the object and/or area.

As depicted in FIG. 2, risk zone data 202a-n from a plurality of data sources may be gathered. The plurality of risk zone data 202a-n may comprise information indicative of a level of risk of a single object or area or may comprise information indicative of a level of risk of a plurality of objects and/or areas and/or types of objects and/or areas. First risk zone data 202a may, for example, be descriptive of insurance company claim data (or insurance industry loss data—e.g., Comprehensive Loss Underwriting Exchange (CLUE) data, available from a third-party data source such as the Insurance Services Office, Inc. (ISO)), and/or may comprise federal, state, regional, town/local, and/or municipal data reports, such as police reports, fire department reports, Department of Transportation (DOT) reports, and/or Department of Motor Vehicle (DMV) reports, providing accident and/or crime data at various locations. Other risk zone data 202n may comprise, in some embodiments, public news and/or weather feeds and/or databases regarding accident or crime stories at various locations and weather conditions. In some embodiments, the first risk zone data 202a may comprise other private, public or volunteer first responder data reports, such as hospital reports, ambulance/EMT data, tow truck data, American Automobile Association (AAA) data, National Highway Transportation Administration (NHTSA) data, and the like (e.g., providing accident and/or crime data at various locations).

In some embodiments, the risk zone data 202a-n may be descriptive of police report and/or other crime data for businesses such as supermarkets in a particular geographic region. In some embodiments, the risk zone data 202a-n may be descriptive of an average number of injuries per hour at a particular location and/or within a particular area (e.g., building, city, road, county, state, geographic and/or topographic area), while other risk zone data 202a-n may be descriptive of a number of experienced malfunctions and/or failed safety inspections at a particular drawbridge.

According to some embodiments, the process 200 may also or alternatively comprise one or more actions associated with risk zone processing 210. As depicted in FIG. 2, for example, some or all of the risk zone data 202a-n may be determined, gathered, transmitted and/or received, and/or otherwise obtained for risk zone processing 210. In some embodiments, risk zone processing 210 may comprise aggregation, analysis, calculation, filtering, conversion, encoding and/or decoding (including encrypting and/or decrypting), sorting, ranking, de-duping, and/or any combinations thereof.

According to some embodiments, a processing device may execute specially programmed instructions to process (e.g., the risk zone processing 210) the risk zone data 202a-n to define a risk zone metric and/or index. Such a risk zone metric may, for example, be descriptive (in a qualitative and/or quantitative manner) of historic, current, and/or predicted risk levels of an object and/or area. In some embodiments, the risk zone metric may be time-dependent (e.g., a level of risk of a computer network being down may be determined based on any given time of day), time or frequency based (e.g., accidents per hour), and/or an average, mean, and/or other statistically normalized value (e.g., an index).

According to some embodiments, there may be a correlation between the risk level and weather events when determining risk of loss. For example, a given risk level may correlate to a higher risk when there is ice, snow, or rain likely to occur, than when it is dry.

In some embodiments, the process 200 may also or alternatively comprise one or more actions associated with insurance underwriting 220. Insurance underwriting 220 may generally comprise any type, variety, and/or configuration of underwriting process and/or functionality that is or becomes known or practicable. Insurance underwriting 220 may comprise, for example, simply consulting a pre-existing rule, criteria, and/or threshold to determine if an insurance product may be offered, underwritten and/or issued to customers, based on any relevant risk zone data 202a-n. One example of an insurance underwriting 220 process may comprise one or more of risk assessment 230 and/or premium calculation 240 (e.g., as shown in FIG. 2). In some embodiments, while both the risk assessment 230 and the premium calculation 240 are depicted as being part of an exemplary insurance underwriting 220 procedure, either or both of the risk assessment 230 and the premium calculation 240 may alternatively be part of a different process and/or different type of process (and/or may not be included in the process 200, as is or becomes practicable and/or desirable).

The risk zone data 202a-n and/or a result of the risk zone processing 210 may, for example, be determined and utilized to conduct risk assessment 230 for any of a variety of purposes. In some embodiments, e.g., the risk assessment 230 may be conducted as part of a rating process for determining how to structure an insurance product and/or offering. A "rating engine" utilized in an insurance underwriting process may, for example, retrieve a risk zone metric (e.g., provided as a result of the risk zone processing 210) for input into a calculation (and/or series of calculations and/or a mathematical model) to determine a level of risk or the amount of risky behavior likely to be associated with a particular object and/or area. In some embodiments, how often a customer travels through a high risk zone route may correspond to a high risk zone metric associated with that customer. In some embodiments, the risk assessment 230 may comprise determining that a customer views and/or utilizes risk zone information (e.g., made available to the customer via the insurance company and/or a third-party).

According to some embodiments, the process 200 may also or alternatively comprise one or more actions associated with premium calculation 240 (e.g., which may be part of the insurance underwriting 220). In the case that the process 200 comprises the insurance underwriting 220 process, for example, the premium calculation 240 may be utilized by a "pricing engine" to calculate (and/or look-up or otherwise determine) an appropriate premium to charge for an insurance policy associated with the object and/or area for which the risk zone data 202a-n was collected and for which the risk assessment 230 was performed. In some embodiments, the object and/or area analyzed may comprise an object and/or area for which an insurance product is sought (e.g., the analyzed object may comprise an automobile for which an automobile insurance policy is desired or a business for which business insurance is desired). According to some embodiments, the object and/or area analyzed may be an object and/or area other than the object and/or area for which insurance is sought (e.g., the analyzed object and/or area may comprise a tunnel through which the automobile for which the automobile insurance policy is desired is often driven or a road which has had a high number of accidents over the past twelve (12) months, or other desired period).

According to some embodiments, the process 200 may also or alternatively comprise one or more actions associated with insurance policy quote and/or issuance 250. Once a policy has been rated, priced or quoted and the customer has accepted the coverage terms, the insurance company may, for example, bind and issue the policy by hard copy and/or electronically to the customer/insured.

In general, a customer may visit a website and/or an insurance agent, for example, provide the needed information about the customer and type of desired insurance, and request an insurance policy and/or product. According to some embodiments, the insurance underwriting 220 may be performed utilizing information about the potential customer and the policy may be issued based on a result thereof. Insurance coverage may, for example, be evaluated, rated, priced, and/or sold to one or more customers, at least in part based on the risk zone data 202a-n. In some embodiments, an insurance company may have the potential customer indicate electronically, on-line, or otherwise whether they have any risk zone sensing (e.g., telematics) devices (and/or which specific devices they have) and/or whether they are willing to install them or have them installed. In some embodiments, this may be done by check boxes, radio buttons, or other form of data input/selection, on a web page and/or via a mobile device application (e.g., via the interfaces 600, 700, 800 of FIG. 6, FIG. 7, and/or FIG. 8 herein).

In some embodiments, the process 200 may comprise telematics data gathering, at 252. In the case that a customer desires to have telematics data monitored, recorded, and/or analyzed, for example, not only may such a desire or willingness affect policy pricing (e.g., affect the premium calculation 240), but such a desire or willingness may also cause, trigger, and/or facilitate the transmitting and/or receiving, gathering, retrieving, and/or other obtaining of risk zone data 202a-n from one or more telematics devices. As depicted in FIG. 2, results of the telematics data gathering at 252 may be utilized to affect the risk assessment 230 and/or the premium calculation 240 (and/or otherwise may affect the insurance underwriting 220).

According to some embodiments, the process 200 may also or alternatively comprise one or more actions associated with claims 260. In the insurance context, for example, after an insurance product is provided and/or policy is issued (e.g., via the insurance policy quote and issuance 250), and/or during or after telematics data gathering 252, one or more insurance claims 260 may be filed against the product/policy. In some embodiments, such as in the case that a first object associated with the insurance policy is somehow involved with one or more insurance claims 260, first risk zone data 202a of the object or related objects may be gathered and/or otherwise obtained. According to some embodiments, such risk zone data 202a-n may comprise data indicative of a level of risk of the object and/or area (or area in which the object was located) at the time of casualty or loss (e.g., as defined by the one or more claims 260). Information on claims 260 may be provided to the risk zone processing 210, risk assessment 230, and/or premium calculation 240 to update, improve, and/or enhance these procedures and/or associated software and/or devices.

In some embodiments, the process 200 may also or alternatively comprise insurance policy renewal review 270. Risk zone data 202a-n may be utilized, for example, to determine if and/or how an existing insurance policy (e.g., provided via the insurance policy quote and issuance 250) may be renewed. According to some embodiments, such as in the case that a customer is involved with and/or in charge of (e.g., responsible for) providing the risk zone data 202a-n, a review may be conducted to determine if the correct amount, frequency, and/or type or quality of the risk zone data 202a-n was indeed provided by the customer during the original term of the policy. In the case that the risk zone data 202a-n was lacking, the policy may not, for example, be renewed and/or any discount received by the customer for providing the risk zone data 202a-n may be revoked or reduced. In some embodiments, the customer may be offered a discount for having certain risk zone sensing devices or being willing to install them or have them installed (or be willing to adhere to certain thresholds based on measurements from such devices). In some embodiments, analysis of the received risk zone data 202a-n in association with the policy may be utilized to determine if the customer conformed to various criteria and/or rules set forth in the original policy. In the case that the customer satisfied applicable policy requirements (e.g., as verified by received risk zone data 202a-n), the policy may be eligible for renewal and/or discounts. In the case that deviations from policy requirements are determined (e.g., based on the risk zone data 202a-n), the policy may not be eligible for renewal, a different policy may be applicable, and/or one or more surcharges and/or other penalties may be applied.

According to some embodiments, the process 200 may comprise one or more actions associated with risk/loss control 280. Any or all data (e.g., risk zone data 202a-n and/or other data) gathered as part of a process for claims 260, for example, may be gathered, collected, and/or analyzed to determine how (if at all) one or more of a rating engine (e.g., the risk assessment 230), a pricing engine (e.g., the premium calculation 240), the insurance underwriting 220, and/or the risk zone processing 210, should be updated to reflect actual and/or realized risk, costs, and/or other issues associated with the risk zone data 202a-n. Results of the risk/loss control 280 may, according to some embodiments, be fed back into the process 200 to refine the risk assessment 230, the premium calculation 240 (e.g., for subsequent insurance queries and/or calculations), the insurance policy renewal review 270 (e.g., a re-calculation of an existing policy for which the one or more claims 260 were filed), and/or the risk zone processing 210 to appropriately scale the output of the risk assessment 230.

Figure 3:
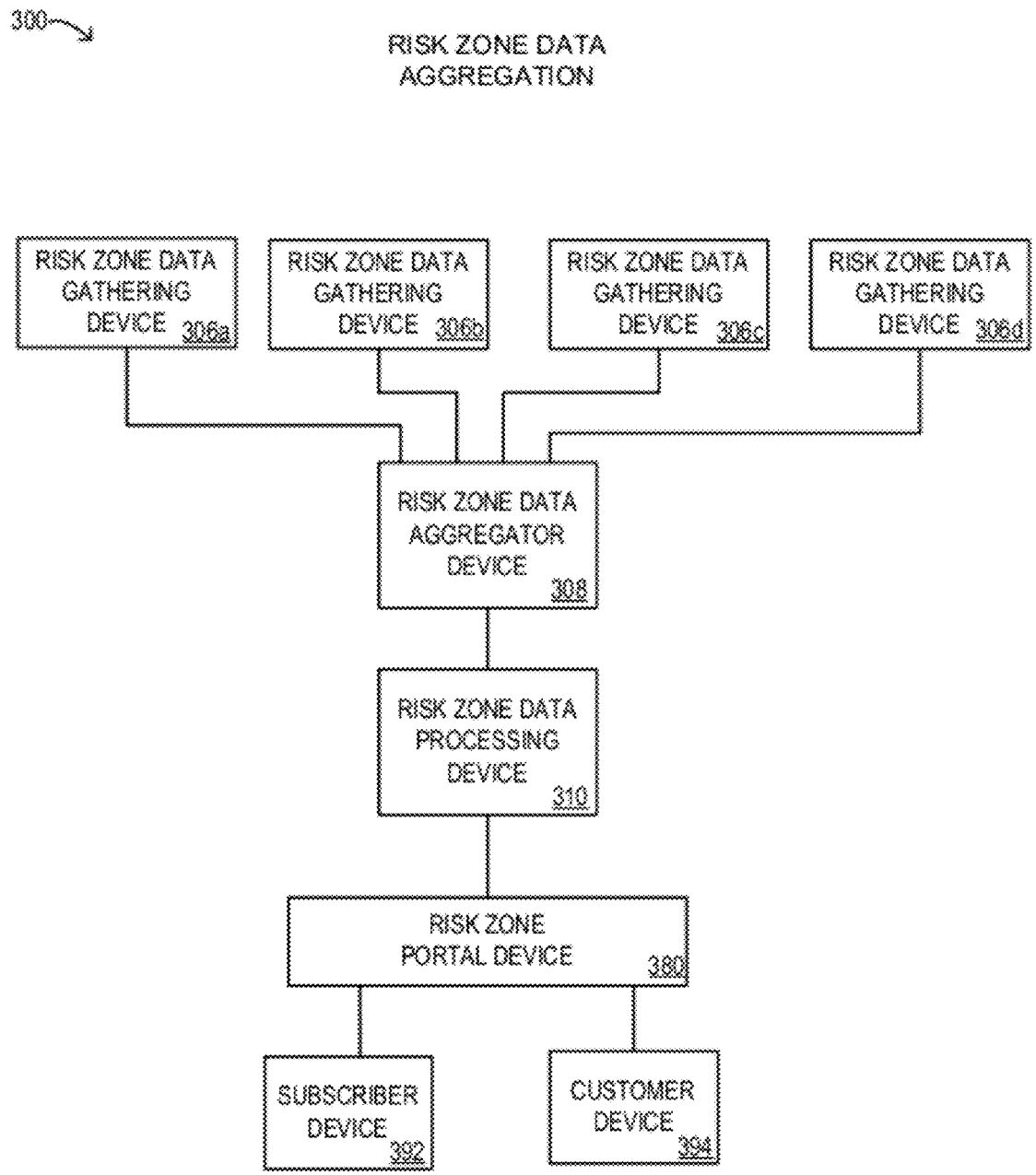
FIG. 3 is a block diagram of a system according to some embodiments.

Turning now to FIG. 3, a block diagram of a system 300 according to some embodiments is shown. In some embodiments, the system 300 may comprise one or more risk zone data gathering devices 306a-d, a risk zone data aggregator device 308, a risk zone data processing device 310, a risk zone portal device 380, a subscriber device 392, and/or a customer device 394. According to some embodiments, any or all of the components 306a-d, 308, 310, 380, 392, 394 of the system 300 may be similar in configuration, quantity, and/or functionality to any similarly named and/or numbered components described herein. Fewer or more components 306a-d, 308, 310, 380, 392, 394 and/or various configurations of the components 306a-d, 308, 310, 380, 392, 394 may be included in the system 300 without deviating from the scope of embodiments described herein. While multiples of some components 306a-d are depicted and while single instances of other components 308, 310, 380, 392, 394 are depicted, for example, any component 306a-d, 308, 310, 380, 392, 394 depicted in the system 300 may be removed from the system 300, may comprise a single device, a combination of devices and/or components 306a-d, 308, 310, 380, 392, 394, and/or a plurality of devices, as is or becomes desirable and/or practicable.

According to some embodiments, the system 300 may be configured to gather, aggregate, and/or process risk zone data (e.g., the risk zone data 202a-n of FIG. 2 herein) for a plurality of objects and/or areas. While any type of desired object and/or area may be monitored and/or analyzed to determine risk zone data and/or indicators thereof, such objects and/or areas may generally fall into one or more categories and/or classes. Such categories may include, but are not limited to, for example, a transportation conduit category containing a transportation conduit object and/or area, a location category containing a location object and/or area, a communication conduit category containing a communication conduit object and/or area, and/or a mechanical category containing a mechanical object and/or area.

As described herein, a transportation conduit object and/or area may generally comprise one or more transportation pathways such as sidewalks, paths, streets, highways, canals, seaways and/or shipping lanes, railroads, aisles in supermarkets, etc. A location object and/or area may generally comprise one or more physical locations such as buildings, street corners, intersections, railroad crossings, stores, shops, malls, entertainment facilities (e.g., sports tracks, casinos, and/or theatres), bridges, tunnels, etc. A communication conduit object and/or area may generally comprise one or more communication pathways such as radio frequencies, wireless and/or wired networks, computer systems, electrical wires (e.g., electrical and/or optical transmission lines that "communicate" electricity and/or optically), websites, chat rooms, social media sites and/or games, etc. A mechanical object and/or area may generally comprise one or more vehicles such as cars, trucks, vans, buses, bicycles, motorcycles, mopeds, scooters, trolleys, trains, trams, subway cars, ships, boats, jet-skis/wave runners, and/or one or more elevators, escalators, drawbridge mechanisms, railroad crossing signals, railroad track switches, electrical transformers, electrical inverters, electrical generation equipment and/or machines, cranes, conveyer belts, factory equipment, and/or portions or parts thereof.

In some embodiments, the risk zone data gathering devices 306a-d may be in communication with and/or otherwise coupled to receive data descriptive of the objects and/or areas. The risk zone data gathering devices 306a-d may be utilized, for example, to sense (e.g., in the case of a sensor such as a telematics device), monitor, retrieve (e.g., such as by scanning and/or copying), store, sort, rank, and/or otherwise organize and/or process data descriptive of the objects and/or areas. The data gathered may generally comprise data that is indicative of some measure of risk of one or more of the objects and/or areas (and/or that is descriptive of one or more of the objects and/or areas but is indicative of the risk level of another object and/or area). In some embodiments, one or more of the risk zone data gathering devices 306a-d may conduct pre-processing of the gathered data. Analog data may converted to digital form, for example, data may be grouped, sorted, and/or cleansed (e.g., duplicate data and/or outliers may be removed), compressed, and/or encoded or encrypted data (such as from a "secure" sensor and/or data storage system) may be decoded or decrypted. Similarly, raw data gathered from one or more of the objects and/or areas may be encoded and/or encrypted by a risk zone data gathering device 306a-d (e.g., prior to transmitting and/or otherwise providing the information to the risk zone data aggregator device 308).

In some embodiments, risk zone data may be obtained from a vendor and/or third-party, such as a police department, fire department, emergency response unit, roadside assistance organization, hospital, doctor, insurance company, DOT, Department of Natural Resources (DNR), Department of Homeland Security (DHS), and/or DMV. Data may also or alternatively be provided by other vendors and/or state and federal agencies.

Figure 4:
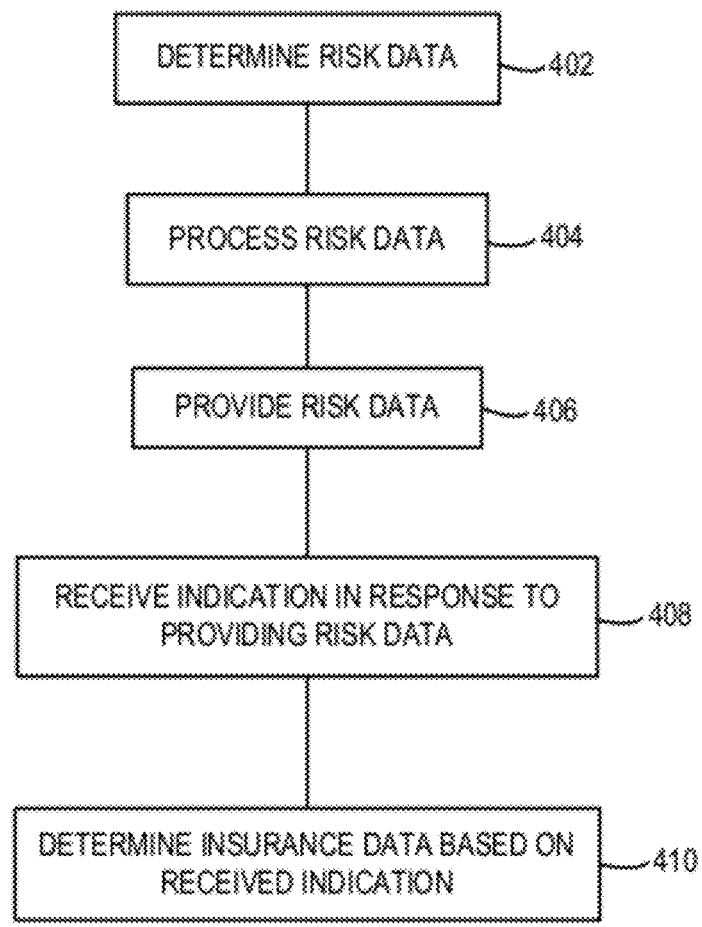
FIG. 4 is a block diagram of a method according to some embodiments.
Figure 5:
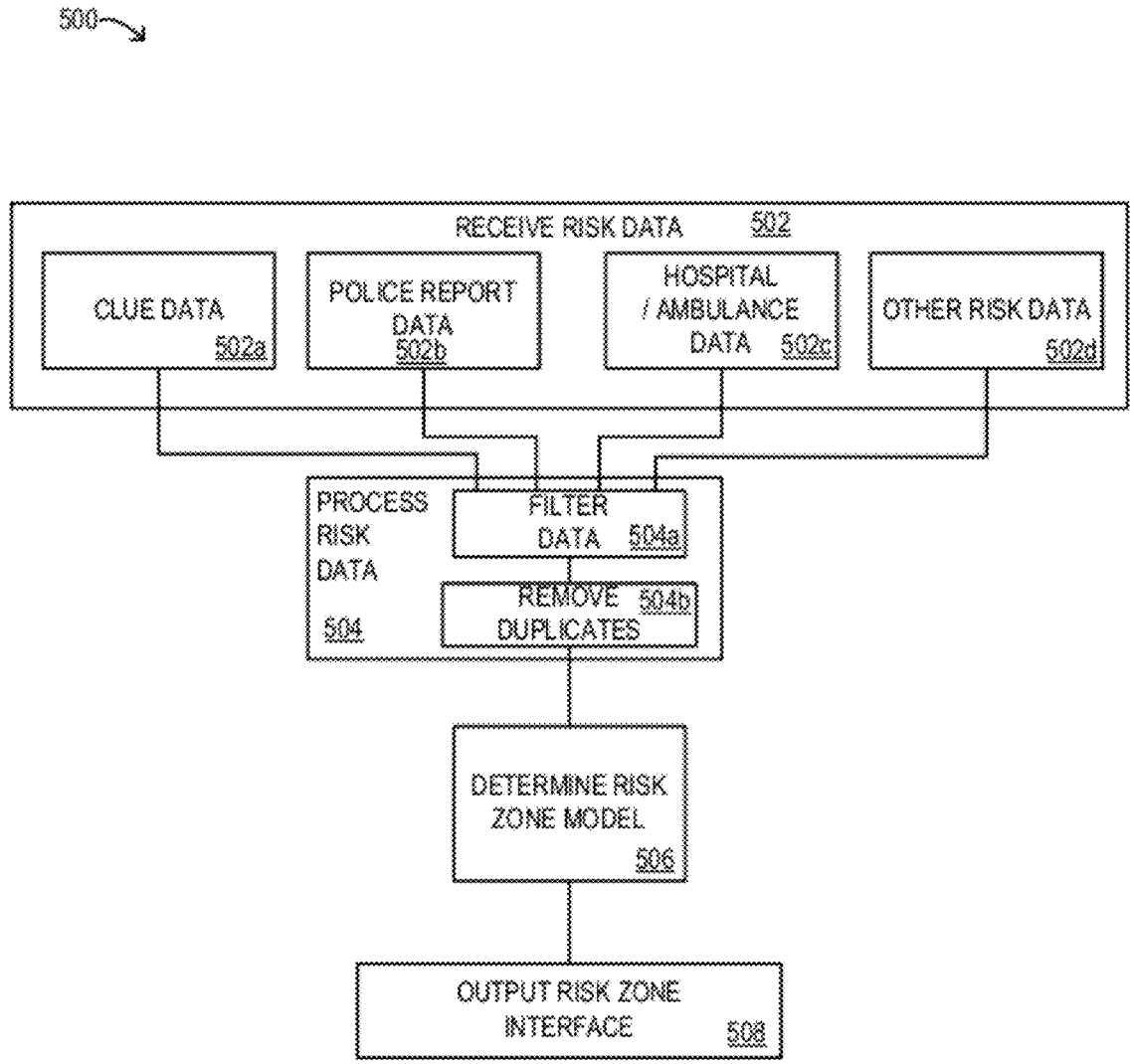
FIG. 5 is a block diagram of a process according to some embodiments.

According to some embodiments, the risk zone data aggregator device 308 may gather, retrieve, sort, rank, store, and/or otherwise organize and/or obtain risk zone data from one or more of the risk zone data gathering devices 306a-d (such as by executing the processes 200, 500 and/or method 400 described in conjunction with FIG. 2, FIG. 4, and/or FIG. 5 herein, or any portions, steps, and/or procedures thereof). The risk zone data aggregator device 308 may further filter and/or cleanse the data to eliminate duplicate data received from the various risk zone data gathering devices 306a-d. In some embodiments, the risk zone data aggregator device 308 may comprise a "bot" and/or may store a program that seeks and retrieves risk zone data from various sources (such as from the risk zone data gathering devices 306a-d and/or from a third party-device or system (not explicitly shown in FIG. 3) such as a police log or a CLUE database). In one embodiment, such as in the case where each of the risk zone data gathering devices 306a-d comprises a webcam, for example, the risk zone data aggregator device 308 may comprise a camera hub, Digital Video Recorder (DVR), and/or PC configured to receive data from each of the webcams 306a-d. In some embodiments, the risk zone data aggregator device 308 may also or alternatively perform other functions such as data load management, power distribution (e.g., providing electrical power to the plurality of risk zone data gathering devices 306a-d, such as by functioning as Power Sourcing Equipment (PSE) in accordance with the Power over Ethernet (PoE) transmission standard 802.3at® published by the IEEE, Sep. 1, 2009). In some embodiments, the risk zone data aggregator device 308 may provide aggregated risk zone data to the risk zone data processing device 310.

The risk zone data processing device 310 may, for example, comprise one or more CPU devices and/or other logic components (e.g., a computerized and/or electronic processor) coupled to receive aggregated risk zone data from the risk zone data aggregator device 308. As described herein, the risk zone data processing device 310 may perform various processing functions (such as the processes 200, 500 and/or method 400 described in conjunction with FIG. 2, FIG. 4, and/or FIG. 5 herein, or any portions, steps, and/or procedures thereof) on the aggregated risk zone data, including computation of a risk zone model. The results of such processing may, according to some embodiments, comprise definition of one or more risk zone metrics such as risk zone ranks, scores, tiers, and/or indices associated with the risk zone model. In some embodiments, the risk zone data processing device 310 may also or alternatively store the aggregated risk zone data. The risk zone data processing device 310 may comprise, for example, a plurality of data storage devices (not separately depicted in FIG. 3; such as the data storage devices 1040a-d of FIG. 10A, FIG. 10B, FIG. 10C, and/or FIG. 10D herein) that store raw, pre-processed, aggregated, summarized, and/or historical risk zone data descriptive of the risk of the desired objects and/or areas. The risk zone data processing device 310 may also or alternatively store one or more qualitative and/or quantitative risk zone scores, ranks, tiers, and/or indices associated with the objects and/or areas. In some embodiments, the risk zone data processing device 310 may also or alternatively perform other functionality such as facilitating risk assessment and/or premium determinations (e.g., the risk zone data processing device 310 may comprise one or more computers operating a specialized program and/or instructions that utilize risk zone data to assess risk and calculate premiums for insurance policies—e.g., the insurance underwriting 220 of FIG. 2).

Risk zone data and/or a risk zone levels or indices may also or alternatively be determined for multiple portions and/or parts of a given object and/or area. For example, in a supermarket, the deli counter, the various aisles, and/or the check-out counters, may each have their own respective risk zone data level and/or rating. In such a case, the overall risk zone rating/level for the supermarket at any given time may be a combination of each of the sub-risk zone levels of the object/area (e.g., some mathematical expression combining each of the risk zone levels of the deli counter, one or more aisles, and/or one or more check-out counters of the supermarket). In some embodiments, there may be multiple and/or sub-risk zone levels or indices that are calculated and provided for different areas and/or parts of a given object/area, e.g., Deli-High, Checkout-Low, Aisles-Med. These sub-levels may be utilized, for example, to predict how risk levels change from one area/part of an object to another. For example, if the aisles of a supermarket have a "high" risk zone level but the check-out counters have a "low" risk zone (e.g., at any particular point and/or range in time), it may be possible to predict when and/or to what extent the risk zone level of the check-out counter may increase. Similarly, if the entry-way risk zone level is "high", the aisles may experience "high" risk zone levels soon (such as in the case that risk is based in terms of busyness, as described in commonly assigned, co-pending U.S. patent application Ser. No. 12/978,535 filed on Dec. 24, 2010, in the name of Collins and titled "RISK ASSESSMENT AND CONTROL, INSURANCE PREMIUM DETERMINATIONS, AND OTHER APPLICATIONS USING BUSYNESS", the busyness concepts of which are hereby incorporated by reference herein). Such processing and/or predictive modeling may be performed, for example, by the risk zone data aggregator device 308 and/or the risk zone data processing device 310.

In some embodiments, the system 300 may include the risk zone portal device 380 that may, for example, be communicatively coupled to receive risk zone data and/or metrics from the risk zone data processing device 310 and/or communicatively coupled to provide such data and/or metrics to one or more of the subscriber device 392 and the customer device 394. According to some embodiments, the risk zone portal device 380 may comprise a server and/or web server configured to function as a "front end" and/or to provide a Graphical User Interface (GUI) via which subscribers and/or customers may access and/or purchase risk zone data and/or metrics. The risk zone portal device 380 may comprise, for example, an e-commerce "store front" such as may be implemented utilizing StoreFront.net™ provided by StoreFront® sCommerce of Olathe (Kansas City metropolitan area), KS, and/or may be sold and/or provided as an application for a cellular telephone or PDA, such as an Apple® iPhone® application. In such a manner, customers and/or subscribers may access and/or be provided with risk zone data for purposes such as for structuring insurance policy terms and/or premiums and/or for accessing risk zone data for informative and/or decision-making purposes (such as what roads to avoid on the way home from work, which restaurants or stores are currently or expected to soon be associated with varying levels of risk, etc.).

The subscriber device 392 and/or the customer device 394 may, according to some embodiments, be or include any type or configuration of network device and/or computing device that is or becomes known or practicable. The subscriber device 392 and/or the customer device 394 may, for example, comprise a telephone (e.g., wired or wireless) and/or other communication device associated with a customer of or subscriber to risk zone metrics and/or data as described herein. In some embodiments, either or both of the subscriber device 392 and the customer device 394 may comprise a portable device and/or mobile terminal such as a PDA, a cellular telephone, a GPS navigation device, a laptop and/or tablet computer, etc. The subscriber device 392 may generally be owned and/or operated by an entity that owns and/or has access to a subscription to risk zone data and/or metrics provided by the risk zone portal device 380. The customer device 394 may, in some embodiments, comprise a subscriber device 392 or may comprise, for example, a company workstation communicatively coupled to the risk zone portal device 380, that may comprise a corporate server and/or corporate-owned and licensed software program and/or package configured to gather, process, and/or provide (e.g., display) risk zone data.

Although the risk zone data gathering devices 306*a-d*, the risk zone data aggregator device 308, and the risk zone data processing device 310 are depicted as separate devices in FIG. 3, in some embodiments, any or all of the components 306*a-d*, 308, 310, 380, 392, 394 of the system 300 (such as the risk zone data gathering devices 306*a-d*, the risk zone data aggregator device 308, and the risk zone data processing device 310) may be embodied in a single device, apparatus, and/or interconnected system. A single entity (such as an insurance company) may own and/or operate devices configured and/or coupled to function as any or all of the components 306*a-d*, 308, 310, 380, 392, 394 of the system 300, for example, or a single computer and/or computer server or system may perform any or all of such functions. In some embodiments, risk zone data gathering devices 306*a-d* may also or alternatively collect, gather, store, and/or provide other types of data such as environmental conditions (e.g., weather).

In some embodiments, data indicative of risk zones and/or risk zone metrics and/or indices may be output and/or provided in various advantageous forms. Data may be provided utilizing graphs, charts, tables, maps, and/or other visual and/or tabular forms of output as is or becomes desirable or practicable. According to some embodiments, such output may be provided via mobile devices (e.g., operated by customers and/or field agents) such as smart phones, PDA devices, tablet computers (e.g., the Apple® iPad™), etc., and/or via one or more other GUI interfaces such as via a website and/or kiosk (e.g., via one or more of the interfaces 600, 700, 800 of FIG. 6, FIG. 7, and/or FIG. 8 herein).

Turning now to FIG. 4, a flowchart of a method 400 according to some embodiments is shown. In some embodiments, the method 400 may be performed and/or implemented by and/or otherwise associated with one or more specialized and/or specially-programmed computers (e.g., the risk zone processing devices 110, 310 of FIG. 1 and/or FIG. 3 herein), computer terminals, computer servers, computer systems and/or networks, and/or any combinations thereof (e.g., by one or more insurance company and/or underwriter computers). In some embodiments, a storage medium (e.g., a hard disk, RAM device, cache memory device, USB mass storage device, and/or DVD; e.g., the data storage devices 1040*a-d* of FIG. 10A, FIG. 10B, FIG. 10C, and/or FIG. 10D herein) may store thereon instructions that when executed by a machine (such as a computerized and/or electronic processor or processing device) result in performance of the method 400 and/or portions thereof.

According to some embodiments, the method 400 may determine risk data, at 402. As described herein, for example, data regarding potential, actual, perceived, and/or predicted risk of an object and/or area may be received from one or more sources. In some embodiments, risk data may be retrieved from a data storage device, such as by utilizing a stored identifier assigned to a particular area and/or object. In the case that the method 400 comprises an insurance underwriting, sales, issuance, re-issuance, and/or evaluation process, risk data associated with an existing or potential insurance policy may be retrieved from a database. If a customer desires to insure an automobile, for example, risk data regarding the vehicle, roads the vehicle is operated on, an area in which the vehicle is garaged, and/or data regarding characteristics of likely (or allowed) operators of the vehicle may be obtained.

In some embodiments, the method 400 may process risk data, at 404. Risk data received and/or otherwise determined at 402, for example, may be analyzed to determine a level of risk associated with the desired policy (e.g., the risk assessment 230 of FIG. 2). In some embodiments, such as in the case that risk data is pre-processed and/or processed by a third-party, no analysis and/or minimal analysis may be needed. Processing the risk data at 404 may comprise, for example, formatting the risk data for provision to one or more customers.

According to some embodiments, the method 400 may provide risk data, at 406. The risk data determined at 402 and/or processed at 404 may, for example, be uploaded to a website, published, broadcast, transmitted, and/or otherwise provided to one or more customers. In some embodiments, the risk data may be provided at 406 via any or all of the interfaces 600, 700, 800, of FIG. 6, FIG. 7, and/or FIG. 8 herein. In such a manner, for example, a customer may view risk data to make various determinations and/or plan or effectuate various actions. In the case that the method 400 comprises and/or is associated with an insurance process, the customer may be provided with a discounted premium and/or reduced deductible in consideration for the customer viewing the risk data provided at 406. It may be determined, for example, that a customer viewing the risk data may be more likely to make safer (i.e., less risky) decisions after viewing the risk data.

In some embodiments, the method 400 may receive an indication in response to providing the risk data, at 408. An indication that the customer actually viewed and/or accessed the risk data provided at 406 may, for example, be utilized to determine if any given insurance discount and/or pricing should be offered and/or provided to the customer. In such a manner, the frequency, duration, and/or other aspects associated with the customer's viewing and/or utilization of the risk data may be verified and/or approximated, such as to make sure that only customers who actually take advantage of the risk data obtain the appropriate reward, discount, etc. In some embodiments, there may be requirements regarding how often and/or how long a customer views, access, and/or utilizes the risk data. Such requirements may be verified by obtaining indications of the customer's usage of, for example, a website, portal, and/or interface via which the risk data is provided (e.g., at 406). In some embodiments, the received indication may be indicative of one or more actions and/or decisions that the customer has or will make or implement based on the risk data. The indication may, for example, be descriptive of a particular travel route, method, and/or time frame that has been chosen by the customer based on the risk data (e.g., via a navigation device, trip planning software, and/or via travel itinerary and/or ticket purchases and/or reservations).

According to some embodiments, the method 400 may determine insurance data based on the received indication, at

410. In some embodiments for example, how (and/or when) the customer utilizes the risk data may be determinative of an insurance premium, deductible, discount, surcharge, renewal decision, and/or reward. In the case that a customer makes transportation decisions in a manner that is likely to reduce risk (e.g., based on the risk data), for example, a reduced insurance premium, reduced deductible, a discount, and/or a reward may be provided. In some embodiments, such as in the case that a customer views or access the risk data in accordance with certain requirements (e.g., once a week or every time they activate their navigational device in their vehicle), a discount, reward, etc. may also or alternatively be provided. According to some embodiments, reward points and/or metrics may be calculated based on the customer's utilization of the risk data. Risk data metrics associated with a customer's selection and/or choices may be utilized to calculate, for example, a number and/or level of reward and/or compliance points for the customer. Different tiers of reward levels and/or compliance levels may be established, for example, and a customer's points (e.g., based on risk data utilization) may be tallied to determine which tier and/or level (e.g., of discount, reward, premium, and/or deductible) the customer qualifies for. In some embodiments, the reward, etc., may be provided to the customer.

Referring now to FIG. 5, a diagram of a process 500 according to some embodiments is shown. According to some embodiments, the process 500 may receive risk zone data 502, such as CLUE data 502*a*, police data 502*b*, hospital/ambulance data 502*c*, and/or other risk data 502*d*. The risk zone data 502*a-d* of one or more objects and/or areas that may be related to and/or otherwise associated with an insurance product and/or policy, for example, may be determined, transmitted, received, calculated, looked-up, retrieved, and/or derived. In some embodiments, the risk zone data 502*a-d* may be gathered and/or aggregated as described with respect to the process 200 of FIG. 2 herein. In some embodiments, some or all of the risk zone data 502*a-d* may be obtained from a third-party. The third-party CLUE data 502*a*, for example, may include information relating to insurance claims from the CLUE database provided by LexisNexis® Risk Solutions, Inc. of Boca Raton, Fla., the police report data 502*b* may comprise data from police reports available from federal, state, and/or municipal police departments, the hospital/ambulance data 502*c* may be available from various medical facilities and emergency response units, and/or the other risk data 502*d* may originate from other third-party sources, such as fire data from fire departments, weather data from meteorological departments and/or agencies (such as the National Oceanic and Atmospheric Administration (NOAA)), and/or emergency automobile response data from various roadside assistance organizations and/or related sources (e.g., the OnStar® provided by OnStar, LLC of Detroit, Mich.

According to some embodiments, the process 500 may process the risk data 504. The process 500 may, for example, filter data 504*a* and/or remove duplicates 504*b*. Any or all data 502*a-d* received (e.g., at 502) may, for example, be processed as is or becomes desirable and/or practicable for execution of embodiments described herein. As depicted in FIG. 5, the processed, filtered, and/or de-duplicated data may be utilized to determine a risk zone model 506. In some embodiments, the determination of the risk zone model 506 may comprise additional data aggregation and/or processing that may include analysis, calculation, conversion, encoding, and/or decoding (including encrypting and/or decrypting), sorting, ranking, and/or any combinations thereof. According to some embodiments, the processed data, comprising the risk zone model, may be output. The process 500 may, for example, output a risk zone interface 508. In some embodiments, the risk zone interface may be similar to and/or comprise any or all of the interfaces 600, 700, 800 of FIG. 6, FIG. 7, and/or FIG. 8 herein and/or may be utilized to graphically display various parameters, metrics, and/or indices descriptive of the riskiness of various areas and/or objects.

Figure 6:
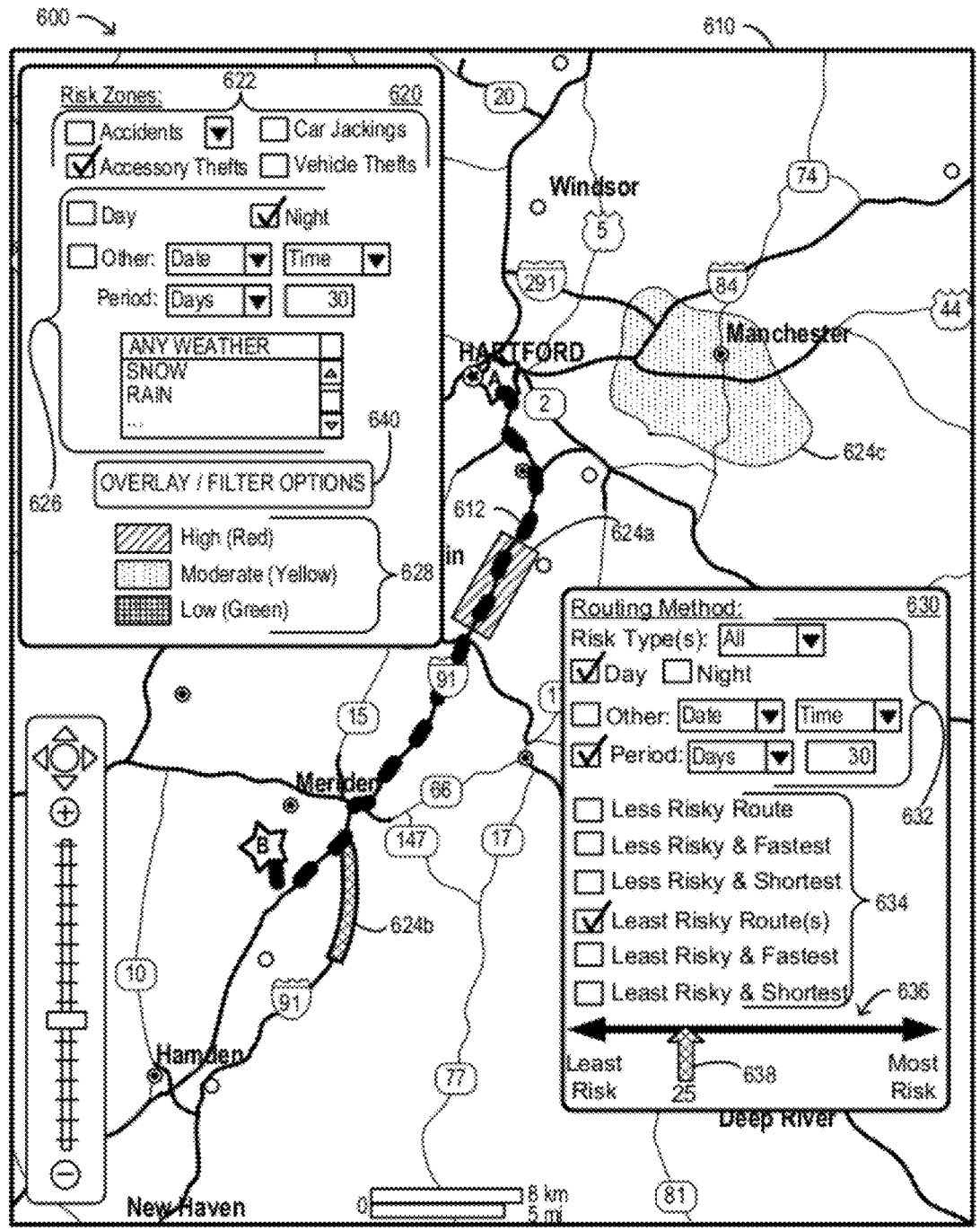
FIG. 6 is an example interface according to some embodiments.

Referring to FIG. 6, an example interface 600 according to some embodiments is shown. In some embodiments, the interface 600 may be generated and/or presented (e.g., output) by a device such as the insurance device 120*a*, the shopping device 120*b*, the navigation device 120*c*, the prioritization device 120*d*, and/or the other risk zone data device 120*e* of the system 100 of FIG. 1 and/or the risk zone portal device 380, the subscriber device 392 and/or customer device 394 of the system 300 of FIG. 3 herein. The interface 600 may, for example, comprise a map 610 such as may be provided by a mapping application, website, navigational device, and/or software such as Google® maps provided by Google®, Inc. of Mountain View, Calif. and/or TomTom® International with U.S. headquarters in Concord, Mass. In some embodiments, the interface 600 may be utilized by an insurance customer via an electronic device such as a portable telephone (or smart phone), PDA, and/or portable computer (such as a laptop, an iPAD™ or other similar device). The customer may download an application provided by the customer's insurance provider, for example, login and/or enter the customer's insurance policy number(s) or other access code, and access the "Risk Zones" interface 600 and/or "Risk Zones" map 610 thereof (e.g., for navigational purposes—such as for planning a trip that reduces risk exposure and/or reduces insurance premiums), and/or for obtaining general information about the riskiness of a certain route or area). In some embodiments, for internet navigational software or navigational devices, the customer may be able to unlock the "Risk Zones" application by indicating that the customer is insured by a certain insurance company and entering the policy number or other access code provided to the customer by the insurance company (or third-party). In some embodiments, only customers insured by certain insurance companies may access the "Risk Zones" application and there may be a special sign-in window or icon with the insurance company name on the screen or accessible from a menu or tab (not shown in FIG. 6). In some embodiments, the application may be made available for purchase by customers or users who are not insurance customers.

As depicted in FIG. 6, map 610 may comprise a navigational aid that facilitates a user traveling from the location marked "A" to a location marked "B". As is typical with mapping and/or navigational tools, a recommended route 612 between points A and B may be displayed. On the illustrated map 610 the recommended route 612 is indicated by shaded, elliptical marks. The recommended route 612 may, for example, be determined via a typical routing method such as "maximize highways", "shortest time", "shortest distance", and/or a "direct" or "easy" route. In some embodiments, the routing method via which the recommended route 612 is determined may be based on risk zone information, metrics, and/or indices.

The interface 600 may, for example, include a risk zone window 620 via which a user (e.g., a customer) of the interface 600 may view (and/or otherwise access) data descriptive of risk zones associated with the map 610. As depicted in FIG. 6, for example, the risk zone window 620 may include selectable risk type options 622 operable to overlay on the map 610 various data such as representing "accidents", "car jackings", "accessory thefts" (which is the option selected for example purposes in FIG. 6), and/or "vehicle thefts". By activating one or more of the selectable risk type options 622, a user may cause the map 610 to display representations 624a-c of the selected risk zone types (e.g., "accessory theft" risk zones may be displayed in the example of FIG. 6). As indicated by the drop-down arrow adjacent to the "accidents" selectable risk type option 622, in some embodiments sub-windows and/or drop-down menus may be provided such as to select specific types of "accidents" (e.g., car vs. animal, fatal accidents, non-fatal accidents, accidents of certain loss or severity ranges) and/or narrow the type of accident risk zone(s) desired for display on the map 610. Thus, in addition to pure number (or quantity) of accidents in a given area, the accidents (and thus the map information) may be further classified in terms of accident "Severity" (e.g., amount of damage to vehicle/property (minor, moderate, significant, totaled), or level of bodily injury (minor, serious, death)), and/or accident "Type" (e.g., car-car; multi-car; car-truck; car-guardrail; car-pole; car-tree; car-animal/person; etc.).

According to some embodiments, the risk zone window 620 may comprise selectable risk zone parameter options 626 such as "day", "night" (which is the option selected for example purposes in FIG. 6), and/or "other", as shown in FIG. 6. In some embodiments, the risk zone parameter options 626 may include a weather drop-down (and/or other) menu item that may, for example, allow the user to filter the map data based on various weather types/events (e.g., "any weather", "snow", "rain", etc. " . . . "). By activating one or more of the selectable risk zone parameter options 626, for example, a user may cause the map 610 to display the representations 624a-c of the selected risk zone types (e.g., as indicated by any or all activated selectable risk type options 622) as they pertain to various timeframes and/or other selected parameters (e.g., time of day, historical time window, weather conditions, etc.). As shown in FIG. 6, for example, the "accessory thefts" by "night" overlay for "any weather" conditions may be displayed and/or a filter for the map 610 may cause the representations 624a-c of risk zones to be displayed.

In some embodiments, the weather risk zone parameter option 626 in the risk zone window 620 may comprise a "Road Conditions" option or overlay or filter for the map 610. When this option is selected, the drop down menu may allow the user to select the type of road condition such as dry, wet, ice, snow, fog, and the like (e.g., which may be related to or independent of the weather conditions). When the user selects a road condition risk zone parameter option 626, the risk zone representations 624a-c are filtered based on the selection. For example, if dry road conditions are selected, only accidents (e.g., in the case that the "accidents" risk type option 622 is selected) that occurred when the road conditions were dry remain in the risk zones display and the colors or highlighting changes accordingly. Similarly, if icy road conditions are selected, only accidents that occurred when the road conditions were icy remain in the risk zones display and the colors or highlighting changes accordingly.

The risk zone data of a roadway (e.g., a transportation conduit object), for example, may be represented on the map 610 in a graphical manner (e.g., the first and/or second representations 624a-b) to represent a total aggregate, average, and/or weighted risk zone index or metric. The risk zone window 620 may, for example, comprise a key 628 which in the example interface 600 of FIG. 6 is descriptive of "high", "moderate", and "low" risk zones. As depicted, for example, a first section 624a of the roadway Interstate 91 (I-91) south of Hartford has experienced (and/or is otherwise associated with) "high" risk zone data for accessory thefts at night, while a second section 624b of Interstate 91 (I-91) south of Meriden has experienced (and/or is otherwise associated with) "low" risk zone data for accessory thefts at night.

According to some embodiments, depending on the type(s) of risk zone(s) represented by the map 610, the representations 624a-c of risk zones may comprise objects and/or methods other than roadway (or travel way) markup. For example, the risk zones in an area or region may be represented by a highlighted region 624c, shown as a "moderate" risk zone area in and around Manchester on the map 610. In that example, there may be moderate risk zone data in the region 624c for the parameters selected. In some embodiments, if the user touches the region 624c or hovers over the region 624c with a mouse, more detailed information regarding the reason(s) for the risk zone level may be displayed (e.g., ten (10) accessory thefts in past five (5) days). In some embodiments, the routing method for the recommended route 612 may be based on one or more of these (and/or other) representations of risk zones 624a-c (and/or the data upon which those representations 624a-c are based).

According to some embodiments, for example, the interface 600 may comprise a routing method window 630, which may be used in addition to or, as an alternative to, the risk zone window 620 to modify the display. The routing method window 630 may comprise selectable options 632 which may, as depicted, be similar to the selectable risk type options 622 presented in the risk zone window 620. The selectable options 632 may, in some embodiments, allow a user to select and/or set the desired risk type, time-frame, parameters, and/or period for the routing method. As shown in the example of FIG. 6, the risk type is set to "all", the "day" option for the time of day is selected to set the timeframe to correspond to daytime risk levels, and the "period" option is selected (to define the data set to be displayed via the map 610) with the period type set to "days" and the period set to thirty (30) days. The routing method for the recommended route 612 may accordingly take into account all and/or overall risk, during the daytime, over the last thirty (30) days, between and/or around A and B, such as may be determined based on historic data recorded for such areas. According to some embodiments, assistance and/or guidance regarding the selectable options 632 may be provided. In the case that planning a route based on a selected time-window may be misleading and/or undesirable (e.g., from a mathematical and/or statistical perspective), for example, a system and/or device that provides the interface 600 may suggest to the user that a different time window (and/or other options) be selected and/or utilized for route guidance.

In some embodiments, the routing method window 630 may comprise a plurality of risk zone-based routing options 634. The routing options may provide the "Least Risky" route, which would provide the route having the lowest level of risk. Risk zone data may be combined and/or analyzed together with typical roadway and/or travel data, for example, to allow the program underlying the interface 600 to determine not only the "shortest" route from A to B, but the "Least Risky & Shortest" route, for example. As shown, the user may select the routing method to be a "Less Risky" route, a "Less Risky & Fastest" route, a "Less Risky & Shortest" route, an overall "Least Risky" route, a "Least Risky & Fastest" route, and/or a "Least Risky & Shortest" route. The different risk zone-based routing options 634 are presented for exemplary purposes only. Fewer, more, and/or different risk zone-based routing options 634 may be presented to the user and/or may be utilized to determine the recommended route 612 in accordance with some embodiments.

As depicted in the example of FIG. 6, the "Least Risky" route(s) option is selected. Thus, the recommended route 612 depicted on the map 610 of the interface 600 represents the determined least risky route and/or routes from point A to point B, based on daytime overall risk levels as experienced over the last thirty (30) days (or a different thirty (30) day period). In some embodiments, such as to potentially obtain more accurate predictive results such as by taking into account daily, weekly, seasonal, and/or annual variations in recorded risk zone data, the date of the future routing prediction may also (or alternatively) be specified (although it is not in the example of FIG. 6).

In some embodiments, such as in the case that one of the "Less Risky" routing methods is chosen, the routing method window 630 may include a risk zone selection/slider bar 636 and/or a risk zone slider/pointer 638. The risk zone selection bar 636 may, for example, comprise a graphical icon of a bar representing a range of risk zone values (e.g., metric and/or index values), from "Least Risky" to "Most Risky". The risk zone slider 638 may, in some embodiments, represent the current and/or set value of risk associated with the desired routing method. As shown, for example, the risk zone slider 638 is set near the least-risky side of the risk zone bar 636. In some embodiments, the risk level represented by the position of the risk zone slider 638 on the risk zone bar 636 may be represented by an indication of the actual value of the current and/or set or desired risk level (e.g., twenty-five (25) as shown on the example risk zone bar 636, having an example range of zero (0) to one hundred (100)).

The risk zone bar 636 and the risk zone slider 638 may be utilized, for example, in the case that a "less risky" routing method is desired, such that the sliding and/or setting of the risk zone slider 638 may define the specific magnitude that corresponds to "less", e.g., twenty-five (25) in the example of FIG. 6. In that example, when the risk zone slider 638 is moved to a new position, one or more routes having a corresponding risk level may be highlighted in a different color, for example, on the map 610. In other embodiments, the user may define their own route(s) and utilize the risk zone bar 636 and/or risk zone slider 638 to determine a risk zone rating of the defined route. As the user slides the slider 638, different routes from A to B may be highlighted indicating which routes meet the slider-selected risk zone rating. This may be advantageous, for example, in the case that the user's insurance company offers reductions in insurance premiums for customers that conduct themselves within certain risk zones and/or risk thresholds. To increase awareness of risk zone locations, the interface 600 may further provide real time warnings or other notices when the user is approaching, entering, and/or leaving risk zones. In some embodiments, such warnings may correspond to the settings the user has selected in the risk zone window 620 and/or the routing method window 630. In some embodiments, the interface 600 may comprise an overlay/filter options button 640 that may allow the user to select and/or set or define options for the interface 600 in more detail. Activation and/or selection of the overlay/filter options button 640 may, for example, cause a different interface screen (such as the interface 800 of FIG. 8) to be displayed (not shown in FIG. 6), via which user preferences may be set.

According to some embodiments, an insurance company may offer tiered discounts and/or premium rate levels for customers who commit to (and/or who actually do) maintain certain risk zone parameters within predetermined thresholds. In the case of travel, for example, trips planned and/or taken (e.g., monitored via GPS in an in-car navigational device and/or via the customer's mobile communications device) may be tallied with respect to various risk zone ratings. Overall ratings in certain time periods (e.g., exposure to risk per month) and/or a weighted risk zone aggregate (e.g., frequency of experienced risk levels) may, in some embodiments, be determined for individual customers. In the case that the tracked metrics fall within predetermined thresholds (e.g., an average experienced risk level of less than seventy-five (75) in any given month) the customer may qualify for a reduced premium, discount, and/or other reward (e.g., frequent flyer miles, reward points, and/or prizes; e.g., ten percent (10%) off monthly premium). In some embodiments, the user may obtain a certain number of points for certain risk zone levels and receive a benefit if the user stays below (or above) a threshold number of points (over a set period of time). In some embodiments, the user may obtain benefits if user stays below (or above) a threshold percentage of trips having a certain risk zone level (over a set period of time).

Figure 7:
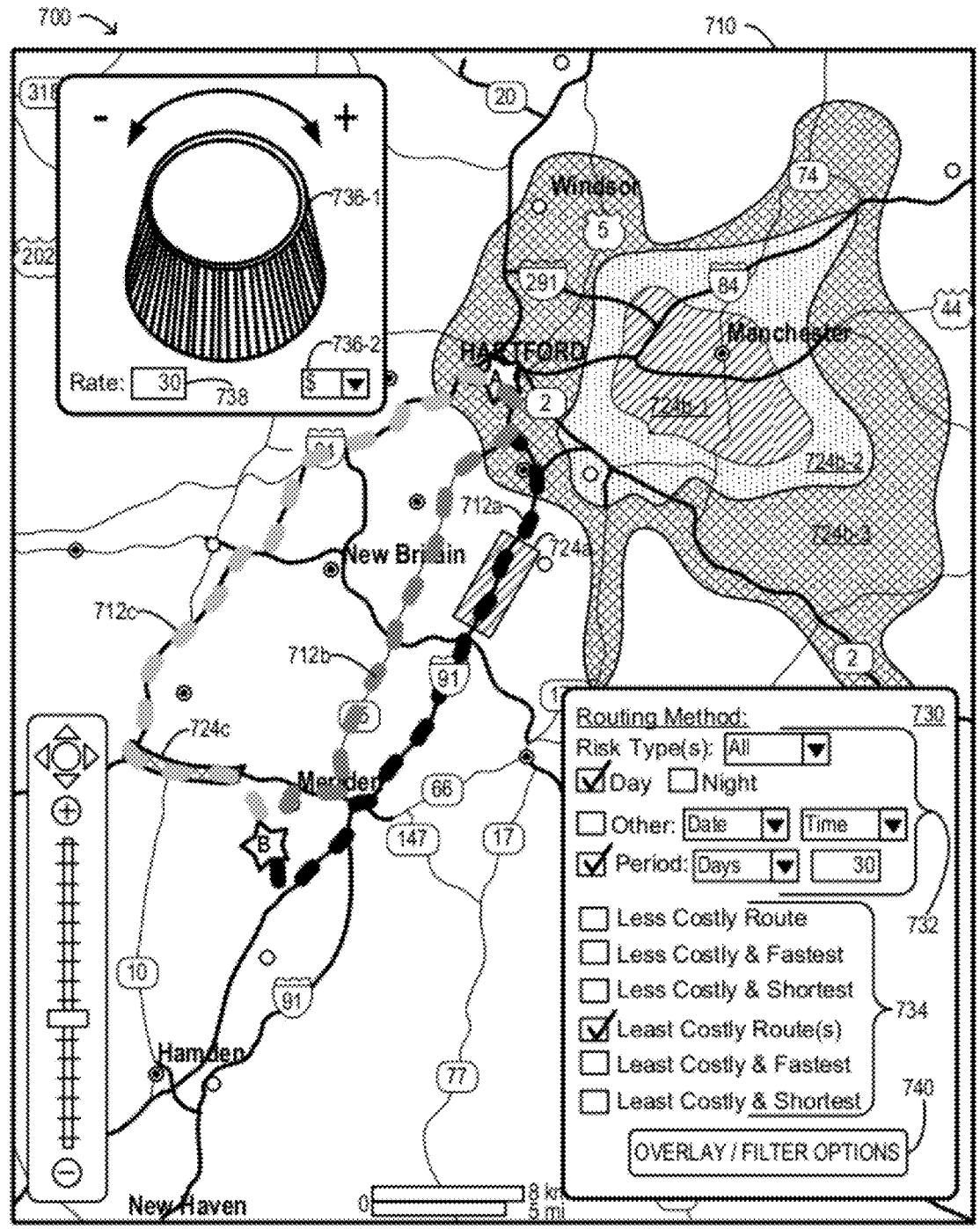
FIG. 7 is an example interface according to some embodiments.

According to some embodiments, desired discount and/or insurance premium levels may be taken into account in the routing method for the recommended route 612. Turning to FIG. 7, for example, an example interface 700 according to some embodiments is shown. In some embodiments, the interface 700 may be generated and/or presented (e.g., output) by a device such as the insurance device 120*a*, the shopping device 120*b*, the navigation device 120*c*, the prioritization device 120*d*, and/or the other risk zone data device 120*e* of the system 100 of FIG. 1 and/or the risk zone portal device 380, the subscriber device 392 and/or customer device 394 of the system 300 of FIG. 3 herein. The interface 700 may, for example, comprise a map 710 such as the map 610 of the interface 600 of FIG. 6 herein. The interface 700 may, for example, display a plurality of recommended routes 712*a-c* and/or may provide representations 724*a-c* of various risk zones. According to some embodiments, the interface 700 may comprise a routing method window 730 that may comprise a plurality of selectable risk type options 732 and/or a plurality of routing method options 734.

The routing method options 734 may, in accordance with some embodiments, include one or more options tied to insurance premium and/or discount levels such as the depicted "Less Costly Route", "Less Costly & Fastest", "Less Costly & Shortest", "Least Costly Route(s)", "Least Costly & Fastest", and/or "Least Costly & Shortest" (and/or other non-depicted options such as "Maintain 10% Discount" or "Biggest Discount" or "Most Reward Points", etc.). In such a manner, the routing method may facilitate the maintenance of the user's activities within the desired threshold ranges and/or parameters. In some embodiments, a risk zone knob 736-1 may allow a user to set a scale of insurance premiums and/or discounts, such as from "Lowest Premium" or "Biggest Discount" to "Highest Premium" or "Lowest Discount", such as by turning the knob 736-1 in a positive "+" or negative "−" direction, as depicted. In some embodiments, the user may utilize a parameter type box 736-2 such as by selecting from a drop-down list of available parameter options such as the dollar amount "$" as depicted, a percentage, tier, level, etc. In some embodiments, a value of a desired parameter may be displayed and/or directly set or defined via a parameter entry box 738. As depicted in FIG. 7, for example, a user has set the interface 700 (and/or the map 710) to display routes that would result in a thirty dollar ($30) insurance premium (e.g., per time period such as day, month, etc.), deductible, discount amount, etc. (e.g., by setting the value directly via the parameter entry box 738, by specifying the parameter type via the parameter type box 736-2 and/or by moving and/or adjusting the risk zone knob 736-1). In such a manner, for example, the routing method may be set to be based on the effect that traveling any given route may have on the user's insurance premiums. In some embodiments, the user may enter a desired discount (name your "Risk Zone" discount) or a desired premium (name your "Risk Zone" premium) into the parameter entry box 738 and/or via a set-up screen (not shown) which may set the default risk zone levels for suggested routes to obtain that discount or premium. The user may then move the risk zone knob 736-1 from that default and/or set point to select other possible routes, as desired. In some embodiments, the risk zone knob 736-1 may comprise an actual physical object such as a knob, switch, toggle, scroll button, button, etc., of an apparatus (such as a user's navigational device and/or PC input device) and/or may comprise a virtual object such as a virtual and/or simulated knob or device on a screen and/or touch-screen.

According to some embodiments, adjustments made utilizing the risk zone knob 736-1 (and/or data entered via the parameter entry box 738) may affect the recommended route(s) 712a-c and/or the displayed risk zone representations 724a-c. Setting the desired risk zone-related cost level to a first value, for example, may cause a first recommended route 712a to be displayed and/or plotted, while changing or setting the desired cost level to a second or third value may cause a second recommended route 712b or a third recommended route 712c to be displayed or otherwise output, respectively. In some embodiments, such as in the case of the second risk zone representation 724b, which in the example of FIG. 7 depicts an area of risk, altering the desired cost (and/or reward, deductible, discount, etc.) level may alter the size, shape, and/or composition of the second representation 724b. At a first desired cost level, for example, a first area of the second representation 724b-1 may be identified and/or depicted as an area associated with a particular level and/or type of risk or cost. As the desired cost is increased (or decreased), the second representation 724b may be changed to a second area 724b-2 and then a third area 724b-3, which in the example of FIG. 7 are shown as increasingly larger areas. The example of FIG. 7 may represent, for example, a case where a user desires to see an area (e.g., the areas 724b-1, 724b-2, 724b-3) where the user may be permitted to operate their vehicle, based on different discount levels or tiers. A first tier of discount may be available (e.g., five percent (5%)) if the user limits operations to (or avoids) the first area 724b-1, for example, and/or a second tier of discount may be available (e.g., ten percent (10%)) if the user limits operations to (or avoids) the second area 724b-2, and/or a third tier of discount may be available (e.g., twenty percent (20%)) if the user limits operations to (or avoids) the third area 724b-3—e.g., in the example, progressively more difficult and/or restrictive requirements for achieving the increasingly beneficial discount levels.

According to some embodiments, although not explicitly shown in FIG. 7, the interface 700 may facilitate trip and/or route planning by suggesting, recommending, and/or displaying various trip options such as waypoints (e.g., sights, low-risk hubs), rest stops (e.g., gas stations, charging stations, restaurants, bathrooms, picnic areas, parks), etc. (e.g., any or all of which may be based on risk zone data). In some embodiments, the areas 724b-1, 724b-2, 724b-3 may be colored, shaded, and/or otherwise displayed or presented to convey risk level information (e.g., relative, quantitative, and/or qualitative). The areas 724b-1, 724b-2, 724b-3 may, for example, be provided in accordance with the key 628 of FIG. 6 herein, such that they are descriptive of "high", "moderate", and "low" risk zones, respectively.

According to some embodiments, the interface 700 may be utilized to facilitate decision-making regarding various types of activities and/or with respect to various types of insurance. A homeowner seeking to relocate and/or otherwise obtain housing and/or homeowners' or renters' insurance, for example, may utilize the interface 700 to determine various insurance pricing and/or availability options based on various locations on the map 710. In such a manner, for example, the homeowner may be able to visualize (e.g., via the interface 700) areas where insurance may cost less (e.g., by being presented with insurance values, ranges, etc.).

In some embodiments, the interface 700 may comprise an overlay/filter options button 740 that may allow the user to select and/or set or define options for the interface 700 in more detail. Activation and/or selection of the overlay/filter options button 740 may, for example, cause a different interface screen (such as the interface 800 of FIG. 8) to be displayed (not shown in FIG. 7), via which user preferences may be set.

Turning to FIG. 8, an example interface 800 according to some embodiments is shown. In some embodiments, the interface 800 may be generated and/or presented (e.g., output) by a device such as the insurance device 120a, the shopping device 120b, the navigation device 120c, the prioritization device 120d, and/or the other risk zone data device 120e of the system 100 of FIG. 1 and/or the risk zone portal device 380, the subscriber device 392 and/or customer device 394 of the system 300 of FIG. 3 herein. The interface 800 may, for example, comprise a window 810 that may provide various options that may affect how risk information is output and/or provided.

The interface 800 (and/or window 810) may comprise, according to some embodiments, an activity type selection area 842 that may allow a user, for example, to select and/or define a type of activity for which the user desires to obtain risk zone and/or insurance pricing information. Risk data and/or insurance pricing may vary, for example, based on whether the activity is commuting, vacation, work, etc.

In some embodiments, the interface 800 (and/or window 810) may comprise one or more operator data areas 844 that allow for the entry, selection, and/or defining of operator data. The operator data areas 844 may comprise, for example, an operator characteristics selection area 844-1 and/or an operator attributes selection area 844-2. The operator characteristics selection area 844-1 may, in some embodiments, allow the user to select and/or set data defining characteristics of an operator (e.g., an operator of an insured vehicle in the example of automobile insurance) such as whether the operator's age (or age range), gender, experience level, training, licensing level, etc. The operator attributes selection area 844-2 may, in some embodiments, allow the user to select and/or set data defining attributes of the operator such as whether the operator is fatigued/tired, how long the operator has been driving, whether the operator is distracted, utilizing a cell phone, etc. According to some embodiments, the operator attributes may be determined via telematics data as described herein (e.g., in compiling data to output to the user and/or in determining of the user adheres to various policy requirements—e.g., set by the user). Risk data and/or insurance pricing may vary, for example, based on the various characteristics and/or attributes of the operator (and/or insured, e.g., in the case of non-automotive insurance policies).

In some embodiments, the interface 800 (and/or window 810) may comprise one or more vehicle data areas 846 that allow for the entry, selection, and/or defining of vehicle data. The vehicle data areas 846 may comprise, for example, a vehicle characteristics selection area 846-1 and/or a vehicle attributes selection area 846-2. The vehicle characteristics selection area 846-1 may, in some embodiments, allow the user to select and/or set data defining characteristics of a vehicle (e.g., a vehicle associated with an insurance policy) such as the make, model, and/or year of the vehicle, whether the vehicle has various safety features such as anti-lock brakes, traction control, side-curtain airbags, a Tire Pressure Monitoring System (TPMS), run-flat tires, side-view mirror signals, high-visibility turn signals, accident avoidance, etc. The vehicle attributes selection area 846-2 may, in some embodiments, allow the user to select and/or set data defining attributes of the vehicle such as whether the vehicle is being utilized to tow (e.g., a trailer, boat, etc.), whether the vehicle is being towed (or flat-bedded), whether the vehicle has various accessories such as roof-top cargo carriers or bike racks installed, and/or whether (and/or what type, weight, etc.) the vehicle is carrying an internal cargo, etc. According to some embodiments, the vehicle attributes may be determined via telematics data as described herein (e.g., in compiling data to output to the user and/or in determining if the user adheres to various policy requirements—e.g., set by the user). Risk data and/or insurance pricing may vary, for example, based on the various characteristics and/or attributes of the vehicle (and/or other desired object).

In some embodiments, a report (not shown in FIG. 8) may be provided to a customer based on the utilization of the interface 800 (and/or interfaces 600, 700 of FIG. 6 and/or FIG. 7 herein) and/or otherwise based on the customer's utilization of the risk zone data presented therein. On-demand and/or periodic (e.g., monthly) reports detailing how a customer's utilization (or non-utilization) of risk zone information has affected their insurance premium, deductible, discounts, surcharges, rewards, and/or other insurance data may, for example, be provided. Such reports may show, in some embodiments, what tier or level of risk or discount a customer has achieved, provide suggestions regarding how the customer may improve their risk and/or discount level, and/or show what actual discounts or surcharges have been (or will be, e.g., if the customer does not improve a risk score) applied (e.g., to the customer's insurance and/or other account).

Figure 9:
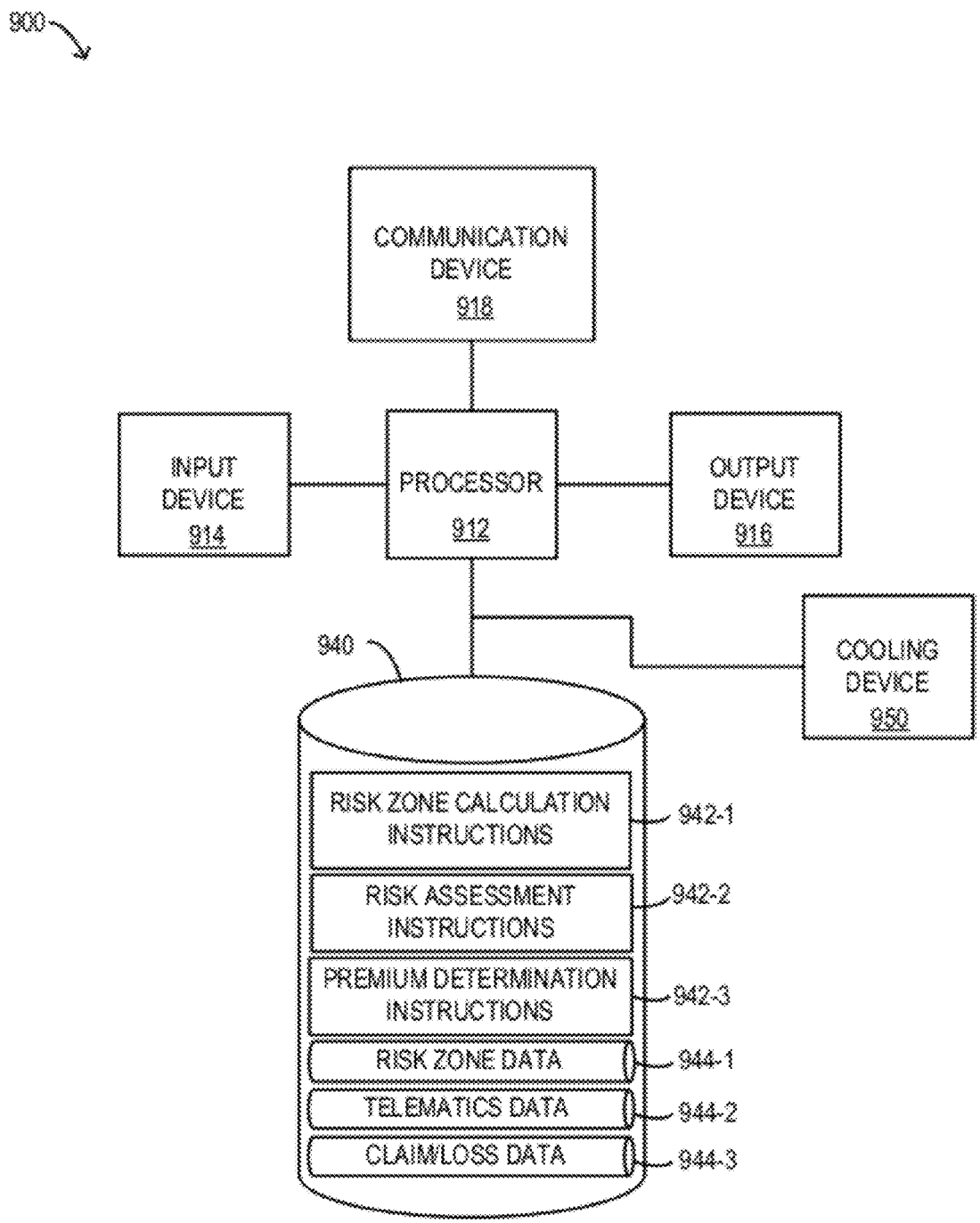
FIG. 9 is a block diagram of an apparatus according to some embodiments.

Turning to FIG. 9, a block diagram of an apparatus 900 according to some embodiments is shown. In some embodiments, the apparatus 900 may be similar in configuration and/or functionality to any of the risk zone data processing device 310, the risk zone data gathering devices 306a-d, the risk zone data aggregator device 308, the risk zone portal device 380, the subscriber device 392, and/or the customer device 394, all of FIG. 3 herein. The apparatus 900 may, for example, execute, process, facilitate, and/or otherwise be associated with the processes 200, 500 and/or the method 400 of FIG. 2, FIG. 4, and/or FIG. 5 herein. In some embodiments, the apparatus 900 may comprise a processing device 912, an input device 914, an output device 916, a communication device 918, and/or a memory device 940. According to some embodiments, any or all of the components 912, 914, 916, 918, 940 of the apparatus 900 may be similar in configuration and/or functionality to any similarly named and/or numbered components described herein. Fewer or more components 912, 914, 916, 918, 940 and/or various configurations of the components 912, 914, 916, 918, 940 may be included in the apparatus 900 without deviating from the scope of embodiments described herein.

According to some embodiments, the processor 912 may be or include any type, quantity, and/or configuration of processor that is or becomes known. The processor 912 may comprise, for example, an Intel® IXP 2800 network processor or an Intel® XEON™ Processor coupled with an Intel® E7501 chipset. In some embodiments, the processor 912 may comprise multiple inter-connected processors, microprocessors, and/or micro-engines. According to some embodiments, the processor 912 (and/or the apparatus 900 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 900 comprises a server such as a blade server, necessary power may be supplied via a standard AC outlet, power strip, surge protector, and/or Uninterruptible Power Supply (UPS) device.

In some embodiments, the input device 914 and/or the output device 916 are communicatively coupled to the processor 912 (e.g., via wired and/or wireless connections and/or pathways) and they may generally comprise any types or configurations of input and output components and/or devices that are or become known, respectively. The input device 914 may comprise, for example, a keyboard that allows an operator of the apparatus 900 to interface with the apparatus 900 (e.g., by a consumer, such as to purchase insurance policies priced utilizing risk zone metrics and/or to monitor risk zone data of local destinations, and/or by an underwriter and/or insurance agent, such as to evaluate risk and/or calculate premiums for an insurance policy). In some embodiments, the input device 914 may comprise a sensor configured to provide information such as encoded risk zone information to the apparatus 900 and/or the processor 912. The output device 916 may, according to some embodiments, comprise a display screen and/or other practicable output component and/or device. The output device 916 may, for example, provide insurance and/or investment pricing and/or risk analysis to a potential customer (e.g., via a website) and/or to an underwriter or sales agent attempting to structure an insurance (and/or investment) product (e.g., via a computer workstation). According to some embodiments, the input device 914 and/or the output device 916 may comprise and/or be embodied in a single device such as a touch-screen monitor.

In some embodiments, the communication device 918 may comprise any type or configuration of communication device that is or becomes known or practicable. The communication device 918 may, for example, comprise a network interface card (NIC), a telephonic device, a cellular network device, a router, a hub, a modem, and/or a communications port or cable. In some embodiments, the communication device 918 may be coupled to provide data to a customer device, such as in the case that the apparatus 900 is utilized as a risk zone portal. The communication device 918 may, for example, comprise a cellular telephone network transmission device that sends signals indicative of risk zone metrics to customer and/or subscriber handheld, mobile, and/or telephone devices. According to some embodiments, the communication device 918 may also or alternatively be coupled to the processor 912. In some embodiments, the communication device 918 may comprise an IR, RF, Bluetooth™, Near-Field Communication (NFC), and/or Wi-Fi® network device coupled to facilitate communications between the processor 912 and another device (such as a customer device and/or a third-party device, not shown in FIG. 9).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 940 may, according to some embodiments, store one or more of risk zone calculation instructions 942-1, risk assessment instructions 942-2, premium determination instructions 942-3, risk zone data 944-1, telematics data 944-2, and/or claim/loss data 944-3. In some embodiments, the risk zone calculation instructions 942-1, risk assessment instructions 942-2, and/or premium determination instructions 942-3 may be utilized by the processor 912 to provide output information via the output device 916 and/or the communication device 918 (e.g., the interface(s) 600, 700, 800 and/or map(s) 610, 710 of FIG. 6, FIG. 7, and/or FIG. 8 herein).

According to some embodiments, the risk zone calculation instructions 942-1 may be operable to cause the processor 912 to process risk zone data 944-1 telematics data 944-2, and/or claim/loss data 944-3 in accordance with embodiments as described herein. Risk zone data 944-1, telematics data 944-2, and/or claim/loss data 944-3 received via the input device 914 and/or the communication device 918 may, for example, be analyzed, sorted, filtered, decoded, decompressed, ranked, scored, plotted, and/or otherwise processed by the processor 912 in accordance with the risk zone calculation instructions 942-1. In some embodiments, risk zone data 944-1, telematics data 944-2, and/or claim/loss data 944-3 (e.g., any or all of which may be descriptive of how risky an object and/or area is) may be fed by the processor 912 through one or more mathematical and/or statistical formulas and/or models in accordance with the risk zone calculation instructions 942-1 to define one or more risk zone metrics, indices, and/or models that may then be utilized for various purposes as described herein.

According to some embodiments, the risk assessment instructions 944-2 may be operable to cause the processor 912 to perform a risk assessment as described herein (e.g., may be operable to cause the processor 912 to process risk zone data 944-1 telematics data 944-2, and/or claim/loss data 944-3 in accordance with embodiments as described herein). Risk zone data 944-1, telematics data 944-2, and/or claim/loss data 944-3 of an object and/or area may be analyzed to create loss distributions, for example, that may be utilized to generate a risk score for an object being insured. The risk assessment instructions 942-2 may, in some embodiments, utilize object data (not explicitly shown in FIG. 9) to determine relationships between objects for which insurance is sought and related objects that are not the subject of an insurance product under evaluation (e.g., the object data may, in addition to storing information on objects such as vehicles that are insured, store information relating such vehicles to roads, intersections, and/or other externality objects that may be related to the vehicles).

In some embodiments, the premium determination instructions 942-3 may be executed by the processor 912 to calculate an insurance premium for an insurance product (e.g., based on the risk zone data 944-1, the telematics data 944-2, and/or the claim/loss data 944-3) and/or to otherwise be operable to cause the processor 912 to process risk zone data 944-1 telematics data 944-2, and/or claim/loss data 944-3 in accordance with embodiments as described herein. According to some embodiments, the risk assessment instructions 942-2 and/or the premium determination instructions 942-3 may utilize the claim/loss data 944-3 to update and/or revise risk and/or premium determinations, respectively. The apparatus 900 may function as a computer terminal and/or server of an insurance and/or underwriting company, for example, that is utilized to process insurance applications. In some embodiments, the apparatus 900 may comprise a web server and/or other portal (e.g., an interactive voice response unit (IVRU)) that provides risk zone data 944-1 to customers.

In some embodiments, the apparatus 900 may comprise a cooling device 950. According to some embodiments, the cooling device 950 may be coupled (physically, thermally, and/or electrically) to the processor 912 and/or to the memory device 940. The cooling device 950 may, for example, comprise a fan, heat sink, heat pipe, radiator, cold plate, and/or other cooling component or device or combinations thereof, configured to remove heat from portions or components of the apparatus 900

Any or all of the exemplary instructions and data types described herein and other practicable types of data may be stored in any number, type, and/or configuration of memory devices that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 900. According to some embodiments, the memory device 940 may be incorporated into and/or otherwise coupled to the apparatus 900 (e.g., as shown) or may simply be accessible to the apparatus 900 (e.g., externally located and/or situated).

Referring to FIG. 10A, FIG. 10B, FIG. 10C, and FIG. 10D, perspective diagrams of exemplary data storage devices 1040*a-d* according to some embodiments are shown. The data storage devices 1040*a-d* may, for example, be utilized to store instructions and/or data such as the risk zone calculation instructions 942-1, the risk assessment instructions 942-2, and/or the premium determination instructions 942-3, each of which is described in reference to FIG. 9 herein. In some embodiments, instructions stored on the data storage devices 1040*a-d* may, when executed by a processor, cause the implementation of and/or facilitate the processes 200, 500 and/or the method 400 of FIG. 2, FIG. 4, and/or FIG. 5 herein (or any portions or combinations thereof). The data storage devices 1040*a-d* may also or alternatively store data such as the risk zone data 202*a-n*, 944-1, telematics data 944-2, and/or claim/loss data 944-3 as described with reference to FIG. 2 and/or FIG. 9 herein.

According to some embodiments, the first data storage device 1040*a* may comprise a CD, CD-ROM, DVD, Blu-Ray™ Disc, and/or other type of optically-encoded disk and/or other storage medium that is or becomes know or practicable. In some embodiments, the second data storage device 1040*b* may comprise a USB keyfob, dongle, and/or other type of flash memory data storage device that is or becomes know or practicable. In some embodiments, the third data storage device 1040*c* may comprise RAM of any type, quantity, and/or configuration that is or becomes practicable and/or desirable. In some embodiments, the third data storage device 1040*c* may comprise an off-chip cache such as a Level 3 (L3) cache memory device. According to some embodiments, the fourth data storage device 1040*d* may comprise an on-chip memory device such as a Level 1 (L1) cache memory device.

The data storage devices 1040*a-d* may generally store program instructions, code, and/or modules that, when executed by a processing device cause a particular machine to function in accordance with one or more embodiments described herein. The data storage devices 1040*a-d* depicted in FIG. 10A, FIG. 10B, FIG. 10C, and FIG. 10D are representative of a class and/or subset of computer-readable media that are defined herein as "computer-readable memory" (e.g., non-transitory memory devices as opposed to transmission devices or media).

Some embodiments described herein are associated with a "user device" or a "network device". As used herein, the terms "user device" and "network device" may be used interchangeably and may generally refer to any device that can communicate via a network. Examples of user or network devices include a Personal Computer (PC), a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A method, comprising:
    accessing, by a specially-programmed processing device, risk data descriptive of a level of risk of at least one of a particular object and a particular area;
    processing, by the specially-programmed processing device, the risk data to determine a level of risk associated with a personal insurance product;
    providing, by the specially-programmed processing device and to a customer device, a graphical interface representing the level of risk of the at least one of the particular object and the particular area;
    receiving, by the specially-programmed processing device and from the customer device, an indication that the graphical interface has been accessed by the customer device; and
    determining, by the specially-programmed processing device, personal insurance data based on the indication that the graphical interface has been accessed by the customer device.

2. The method of claim 1, wherein accessing the risk data comprises:
    receiving the risk data from a sensor associated with the customer.

3. The method of claim 1, wherein the particular object comprises an object for which a personal insurance policy based on the personal insurance data is not written.

4. The method of claim 1, wherein processing the risk data comprises determining a qualitative representation of the risk level.

5. The method of claim 1, wherein the indication comprises an indication that the graphical interface has been accessed by the customer device at a predetermined frequency.

6. The method of claim 1, further comprising:
    receiving an indication that the customer has complied with a risk level requirement of a personal insurance policy associated with the insurance data.

7. The method of claim 6, wherein receiving the indication that the customer has complied comprises receiving telematics data associated with the customer.

8. The method of claim 1, wherein the indication comprises a customer selection made via the graphical interface.

9. The method of claim 1, wherein the personal insurance data comprises at least one of: (i) an insurance premium amount; (ii) an insurance deductible amount; (iii) an insurance discount amount; (iv) an insurance surcharge amount; and (v) a reward points amount.

10. The method of claim 1, further comprising:
    selling the personal insurance product to the customer, the insurance product being based at least in part on the personal insurance data.

11. An apparatus, comprising:
an electronic processing device; and
a memory device in communication with the electronic processing device, the memory device storing specially-programmed instructions that when executed by the electronic processing device result in:
   accessing risk data descriptive of a level of risk of at least one of a particular object and a particular area;
   processing the risk data to determine a level of risk associated with a personal insurance product;
   providing, to a customer device, a graphical interface representing the level of risk of the at least one of the particular object and the particular area;
   receiving, from the customer device, an indication that the graphical interface has been accessed by the customer device; and
   determining personal insurance data based on the indication that the graphical interface has been accessed by the customer device.

12. The apparatus of claim 11, wherein accessing the risk data comprises:
   receiving, from a sensor associated with the customer, the data.

13. The apparatus of claim 11, wherein the particular object comprises an object for which a personal insurance policy based on the personal insurance data is not written.

14. The apparatus of claim 11, wherein processing the risk data comprises determining a qualitative representation of the risk level.

15. The apparatus of claim 11, wherein the indication comprises an indication that the graphical interface has been accessed by the customer device at a predetermined frequency.

16. The apparatus of claim 11, wherein the instructions, when executed by the processing device, further result in:
   receiving an indication that the customer has complied with a risk level requirement of a personal insurance policy associated with the personal insurance data.

17. The method of claim 16, wherein receiving the indication that the customer has complied comprises receiving telematics data associated with the customer.

18. A non-transitory article of manufacture storing instructions that when executed by a processing device result in:
   accessing risk data descriptive of a level of risk of at least one of a particular object and a particular area;
   processing the risk data to determine a level of risk associated with a personal insurance product;
   providing, to a customer device, a graphical interface representing the level of risk of the at least one of the particular object and the particular area;
   receiving, from the customer device, an indication that the graphical interface has been accessed by the customer device; and
   determining personal insurance data based on the indication that the graphical interface has been accessed by the customer device.

19. The article of manufacture of claim 18, wherein the particular object comprises an object for which a personal insurance policy based on the personal insurance data is not written.

20. The article of manufacture of claim 18, wherein the instructions, when executed by the processing device, further result in:
   receiving an indication that the customer has complied with a risk level requirement of a personal insurance policy associated with the personal insurance data.

21. The method of claim 20, wherein receiving the indication that the customer has complied comprises receiving telematics data associated with the customer.

* * * * *